United States Patent
Daniels et al.

(10) Patent No.: US 6,609,480 B2
(45) Date of Patent: Aug. 26, 2003

(54) SQUEEZE CHUTE APPARATUS

(75) Inventors: Duane D. Daniels, Ainsworth, NE (US); Donald Schmitz, Bonesteel, SD (US)

(73) Assignee: Step 5, Inc., Ainsworth, NE (US)

( * ) Notice: Subject to any disclaimer, the term of this patent is extended or adjusted under 35 U.S.C. 154(b) by 0 days.

(21) Appl. No.: 10/057,058

(22) Filed: Jan. 25, 2002

(65) Prior Publication Data

US 2003/0140870 A1 Jul. 31, 2003

(51) Int. Cl.[7] .............................................. A01K 15/00
(52) U.S. Cl. ....................................................... 119/752
(58) Field of Search ................................ 119/752, 751; A01K 15/00

(56) References Cited

U.S. PATENT DOCUMENTS

| | | | | |
|---|---|---|---|---|
| 3,221,707 A | * | 12/1965 | Pearson | 119/731 |
| 3,683,864 A | * | 8/1972 | Priefert | 119/752 |
| 3,777,715 A | * | 12/1973 | Hill et al. | 119/733 |
| 4,027,629 A | * | 6/1977 | Pearson | 119/752 |
| 4,048,961 A | * | 9/1977 | Priefert | 119/752 |
| 4,195,595 A | * | 4/1980 | Shimonovich | 119/724 |
| 4,302,908 A | | 12/1981 | Parker | 49/122 |
| 4,702,200 A | | 10/1987 | Simington | 119/99 |
| 4,707,200 A | * | 11/1987 | Giebel et al. | 156/48 |
| 4,829,936 A | | 5/1989 | Mollhagen | 119/82 |
| 5,065,701 A | * | 11/1991 | Punt | 119/729 |
| 5,263,438 A | | 11/1993 | Cummings | 119/734 |
| 5,331,923 A | * | 7/1994 | Mollhagen | 119/734 |

FOREIGN PATENT DOCUMENTS

| | | | | | |
|---|---|---|---|---|---|
| WO | WO 8805628 A | * | 8/1988 | | A01K/15/00 |
| WO | WO 9952351 A1 | * | 10/1999 | | A01L/13/00 |
| WO | WO 9957968 A1 | * | 11/1999 | | A01K/15/00 |

* cited by examiner

*Primary Examiner*—Charles T. Jordan
*Assistant Examiner*—Susan C. Alimenti
(74) *Attorney, Agent, or Firm*—Thomte, Mazour & Niebergall; Shane M. Niebergall

(57) ABSTRACT

An improved portable squeeze chute apparatus includes a chute having an entrance end, an exit end, opposing sidewalls, a base and a frame. Each of the sidewalls has a plurality of openable and removable upper panels and openable lower panels for accessing upper portions and lower portions of an animal positioned in the chute. Each of the sidewalls is selectively positionable along a generally horizontal axis in order to immobilize lateral movement of an animal positioned in the chute. An exit gate is positioned at the exit end of the chute to prevent the animal from exiting forwardly from the chute. An entrance gate has interconnected entrance gate side portions for selectively preventing the animal from exiting rearwardly from the chute. Various portions of the apparatus are each controllable by a respective hydraulic chain drive assembly. One such portion includes a pair of arcably pivoting neck stretchers for selectively immobilizing the animal's head and neck while the animal is being worked. The controls for the hydraulically powered portions of the chute are disposed at the end of a pivotally mounted boom for easy control of the chute from any side of the chute. A removable and adjustable sternum support is also provided to safely support the animal while it is worked.

34 Claims, 18 Drawing Sheets

SQUEEZE CHUTE APPARATUS

BACKGROUND OF THE INVENTION

1. Field of the Invention

This invention relates to livestock handling equipment and more particularly to a squeeze chute for selectively immobilizing an animal in a standing position to safely allow any number of operations to be safely performed on the animal.

2. Description of the Prior Art

In livestock operations it is often necessary to restrain the animals for palpating, immunizing, branding, treating, weighing, loading, etc. Corrals, loading chutes, alleyways, pens, and the like, have heretofore been constructed and employed by livestock operators and veterinarians for these purposes. These structures are often constructed permanently from materials such as stone, barbed wire, wooden rails, steel pipe, and the like. However the capital investment required for such permanent structures is often prohibitive to ranchers having small operations, particularly those that operate their livestock on small isolated tracts of grazing land. Furthermore, many such ranchers lease, rather than own, their grazing land and naturally wish to avoid making permanent, fixed improvements.

A common solution to this problem is to physically transport the livestock to a remote location having the necessary equipment. However, transporting a herd of large animals tends to be relatively time-consuming and expensive. A round trip from the grazing pasture to a treatment facility requires loading, transporting, and unloading the animals twice. Naturally, the time and expense associated with transporting livestock increases with the distances and number of animals involved.

A disadvantage with many prior art portable animal handling devices is that large animals can be hazardous to workers trying to direct and control them with such equipment. Animals that are unaccustomed to confinement frequently balk at entering confining structures and may even panic. After being restrained, an animal may then suddenly begin kicking or attempt to climb up or back out of the chute. Many of the prior art animal-working structures provide little or no protection from such hazards.

Squeeze chutes can be provided with hydraulic power systems for opening and closing their gates and constricting and expanding their sidewalls to reduce or expand the size of the enclosure in which animals are received. Hydraulic power systems have the advantage of permitting control of the operable components from a single control station. However, these control systems are typically located in a fixed position at one end of the squeeze chute. This can limit the operator's view of the work being performed on the animal and typically limits the placement of the squeeze chute with respect to permanent structures located nearby.

Prior art squeeze chutes are usually provided with sides that pivot inwardly about their bottom ends in order to squeeze livestock. Since the distance between the sides at the bottom must conform substantially to the width of the animal, this type of chute requires adjustment in the spacing of the sides if both large and small animals are to be handled. It is also difficult for large animals to enter or be driven into the chute because its width at the bottom is barely sufficient to accommodate the animal. In addition, the manner in which the sides pivot tends to shock or excite the animal and often causes the animal to lose its balance. The construction of the sides of existing squeeze chutes presents an additional problem in that the sides obstruct access to much of the animal's body, making examination and other operations on the animal difficult.

Another problem with many prior art squeeze chutes relates to the operation of their gates. Squeeze chute gates often include a pair of panels, which are pivotally mounted on the squeeze chute frame so that they traverse arcs when they are moved between their open and closed positions. This motion tends to swing the panels into the faces of the animals, contributing to the animal's stress and sense of distress.

During particular treatment operations, the head of the animal must be firmly held in place to avoid injury to both the animal and the operator. For example, the application of ear tags, implants or other medicaments in the animal's ear is accomplished more safely if the animal's head is substantially immobilized. The same is true during the examination of the animal's eyes, ears and teeth. It is further preferred that the animal's neck be fully exposed and nearly motionless when taking blood samples from or making injections of any kind of serum into the animal's neck.

The present methods of substantially immobilizing the animal's head all require substantial physical effort by the operator. Nearly all of the methods include use of a stanchion either fixed or formed as a part of a portable chute such as those used for de-horning. The animal is held in the stanchion to keep its body confined. Then, a tray or platform may be placed under the animal's head, which is pressed against the tray to hold it in place. An alternative prior art method uses fixed length arms, which extend outwardly from the stanchion gate. These arms are typically not adjustable and generally need to be used in combination with a nose ring and rope. If the animal becomes excited when this method is used, it is necessary for the operator to hold the head until the nose ring can be inserted and the rope tied before the desired operation can be carried out.

Prior art squeeze chute designs typically limit the operator's ability to safely enter the rearward end of the chute, behind the animal, without compromising the physical restraint of the animal. Furthermore, such prior art designs are incapable of selectively immobilizing the animal's hip area without increasing the transverse squeeze pressure exerted by the opposing sidewalls. Accordingly, even if the operator is able to enter the chute behind the animal, simple animal husbandry operations are made difficult if not dangerous.

As the animals are worked, some may have a tendency to lie down or even collapse under the surrounding conditions. Prior art squeeze chutes typically do not provide for a method of selectively and adjustably supporting the animal's abdomen. This not only increases the difficulty of working the animal but compromises the safety of the animal.

What is needed is an animal working apparatus that provides working accessibility to an animal confined therein while assuring relative safety and comfort for both the confined animal being worked and the operators who are working the animal.

SUMMARY OF THE INVENTION

The portable squeeze chute of the present invention is provided for restraining livestock during any number of operations, including branding, vaccinating, artificially inseminating, de-horning, or the like. The chute is generally comprised of a frame, an entrance gate, an exit gate, opposing sidewalls, and a base having adjustably removable sections. The sidewalls are connected to the superstructure such that they are selectively positionable along generally horizontally oriented axis, which extend transversely to the chute. The sidewalls remain parallel as they move equidistantly toward one another to provide equal squeezing pressure to both sides of the animal.

Each of the opposing sidewalls is comprised of a plurality of lower panels, which are pivotable about generally vertical axis at the lower extremity of each sidewall to provide access to the lower portions of the animal. A lower panel latching mechanism selectively retains the lower panels in a closed configuration. The lower panels have planar inner surfaces to avoid providing footholds for an animal positioned in the chute.

The opposing sidewalls are each further comprised of a plurality of removable upper panels, which are pivotable about a generally vertical axis between open and closed positions. The upper panels provide access to the upper portions of an animal positioned in the chute. Upper panel latching mechanisms selectively retain the upper panels in their closed configurations.

The entrance gate has a pair of cooperating entrance doors, which are interconnected so that they synchronously slide along a generally horizontal axis between open and closed positions. As the animal enters the chute, the entrance doors are closed to prevent the rearward movement of the animal. The exit gate is positioned opposite the entrance gate and is provided with opposing doors, which are adapted to selectively abut the sides of an animal's neck. The exit gate doors are interconnected such that they synchronously slide along a generally horizontal axis. When the exit gate is closed, the animal's forward and rearward movement is prevented and the animal can be safely worked. When the exit gate is opened, the animal's forward motion is no longer restrained and it is free to exit the chute.

A pair of elongated neck-stretchers are pivotally mounted adjacent the top portion of the exit gate. When the exit gate is in its closed position, the neck-stretchers can be selectively extended in an arcing direction to engage the lower rearward portion of the animal's head to immobilize the same.

A hip-immobilizing arm is provided for selectively restraining the hip area of the animal. Once the hip area of the animal is restrained, the operator can enter the squeeze chute through one of two rear doors that are mounted to the frame of the chute between the entrance gate and each of the opposing sidewalls. In this position, the operator can safely perform several procedures at the rear of the animal.

A hydraulically powered, roller chain assembly is provided for mechanically operating the opposing sidewalls, the entrance and exit gates, the neck-stretchers and the hip-immobilizing arm. A central control station is provided, which allows a single person to easily operate the squeeze chute. The control station is disposed at the end of a pivotally mounted boom to allow the operator to control the chute from nearly any position around the chute.

An elongated abdomen support is removably secured to the floor of the squeeze chute, between its entrance and exit ends. The abdomen support prevents the animal from laying down while it is being worked. The height of the abdomen support is adjustable to accommodate different sized animals.

It is one of the important objects of the present invention to provide an improved livestock squeeze chute which includes upright sides that remain parallel at all times and are moved equidistantly toward one another to squeeze the animal equally from each side.

Another important object of the invention is to provide a squeeze chute which is able to accommodate both large and small animals without the necessity of structural changes or adjustments.

An additional object of the invention is to provide a squeeze chute in which both the squeeze and release functions of the chute can be fully operated easily and rapidly by a single man from either side of the chute.

A further object of the invention is to provide a squeeze chute having side doors to provide the operator with easy access to the interior of the chute behind the restrained animal.

An additional object of the invention is to provide a squeeze chute having easily openable and removable panels and doors on the sides to facilitate access to the entire body of the animal.

A further object of the invention is to provide a squeeze chute having structure that prevents the restrained animal from climbing out the top end of the squeeze chute.

An additional object of the invention is to provide a squeeze chute having a removable abdomen support that is adjustable in height to accommodate animals of different height.

A further object of the invention is to provide a squeeze chute having removable floor panels.

An additional object of the invention is to provide a squeeze chute having floor panels that are comprised of a plurality of horizontally and vertically spaced traction steps.

A further object of the invention is to provide a squeeze chute having a device for selectively restraining the hip area of the animal.

An additional object of the invention is to provide a squeeze chute wherein the restraining functions are hydraulically powered to allow a single operator to restrain the selected animal.

A further object of the invention is to provide a squeeze chute having a hydraulically powered, roller chain assembly for easily and efficiently operating the restraining structures of the squeeze chute.

An additional object of the invention is to provide a squeeze chute that selectively restrains an animal while reducing the incidence of injury to the animal and operator alike.

These and other objects will be apparent to those skilled in the art.

DESCRIPTION OF THE PREFERRED EMBODIMENT

Figure 1:
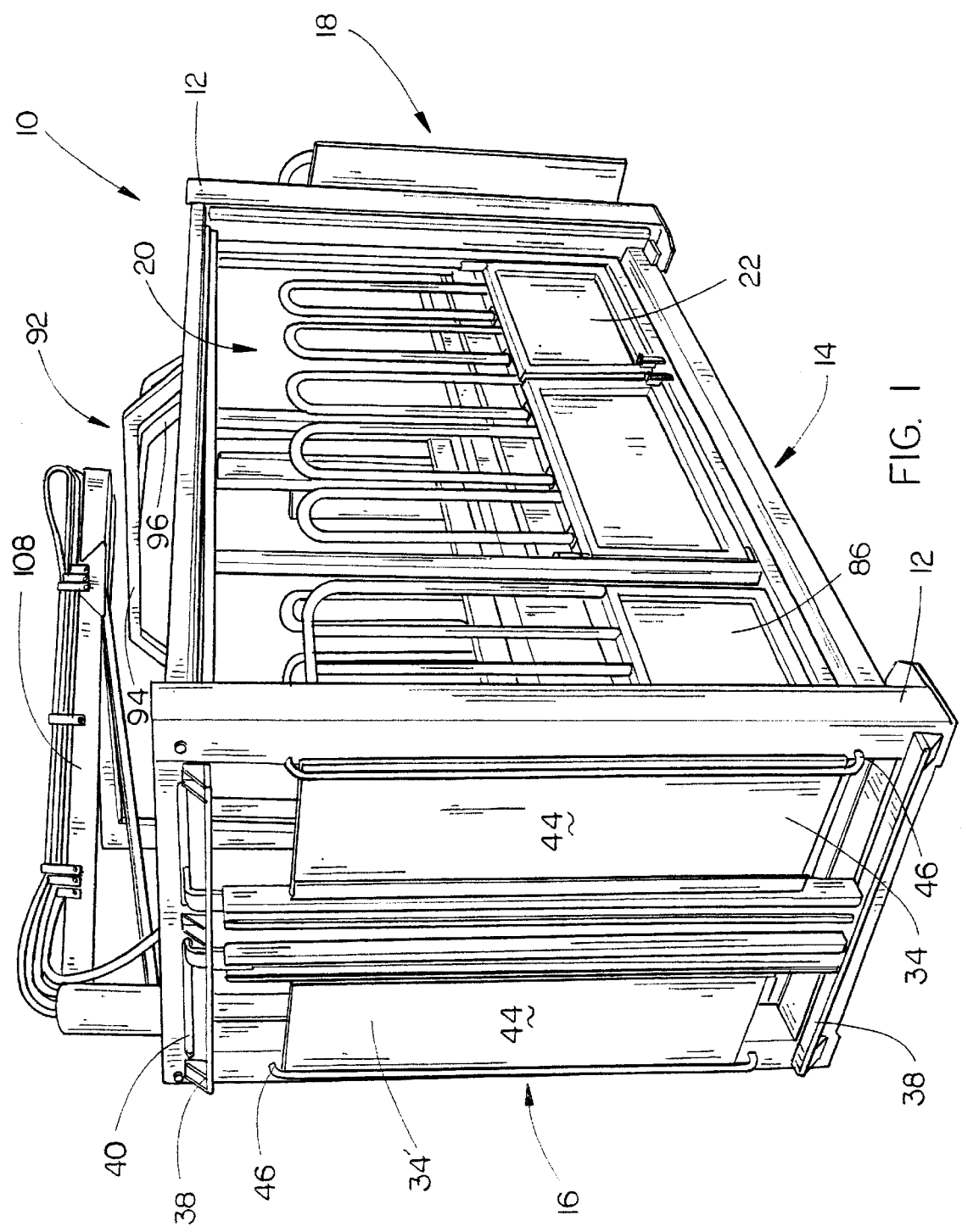
FIG. 1 is a rear perspective view of the squeeze chute of the present invention.

A squeeze chute 10 for working livestock, shown in FIGS. 1–3, 8, 16 and 17, is generally provided with a frame 12 having upper and lower ends and entrance and exit ends. An elongated, generally horizontal base 14 is connected to the frame 12, closely adjacent the lower end thereof, and extends between the entrance and exit ends of the chute 10. An entrance gate 16 is operatively secured to one end of the base 14 and is adapted to selectively slide in a transverse manner, between open and closed positions. An exit gate 18 is operatively secured to the opposite end of the base 14 and is also adapted to slide in a transverse manner, between open and closed positions. Opposing sidewalls 20 and 20' are provided between the entrance gate 16 and exit gate 18.

Opposing sidewalls 20 and 20' are operatively secured to the frame 12, intermediate its entrance and exit ends. Sidewalls 20 and 20' are selectively positionable along a generally horizontal axis, which extends transversely to the chute 10, for immobilizing the lateral movement of the animal within the chute 10. The sidewalls 20 and 20' remain parallel and substantially vertical as they move equidistantly toward one another to provide equal squeezing pressure to both sides of the animal.

Figure 13:
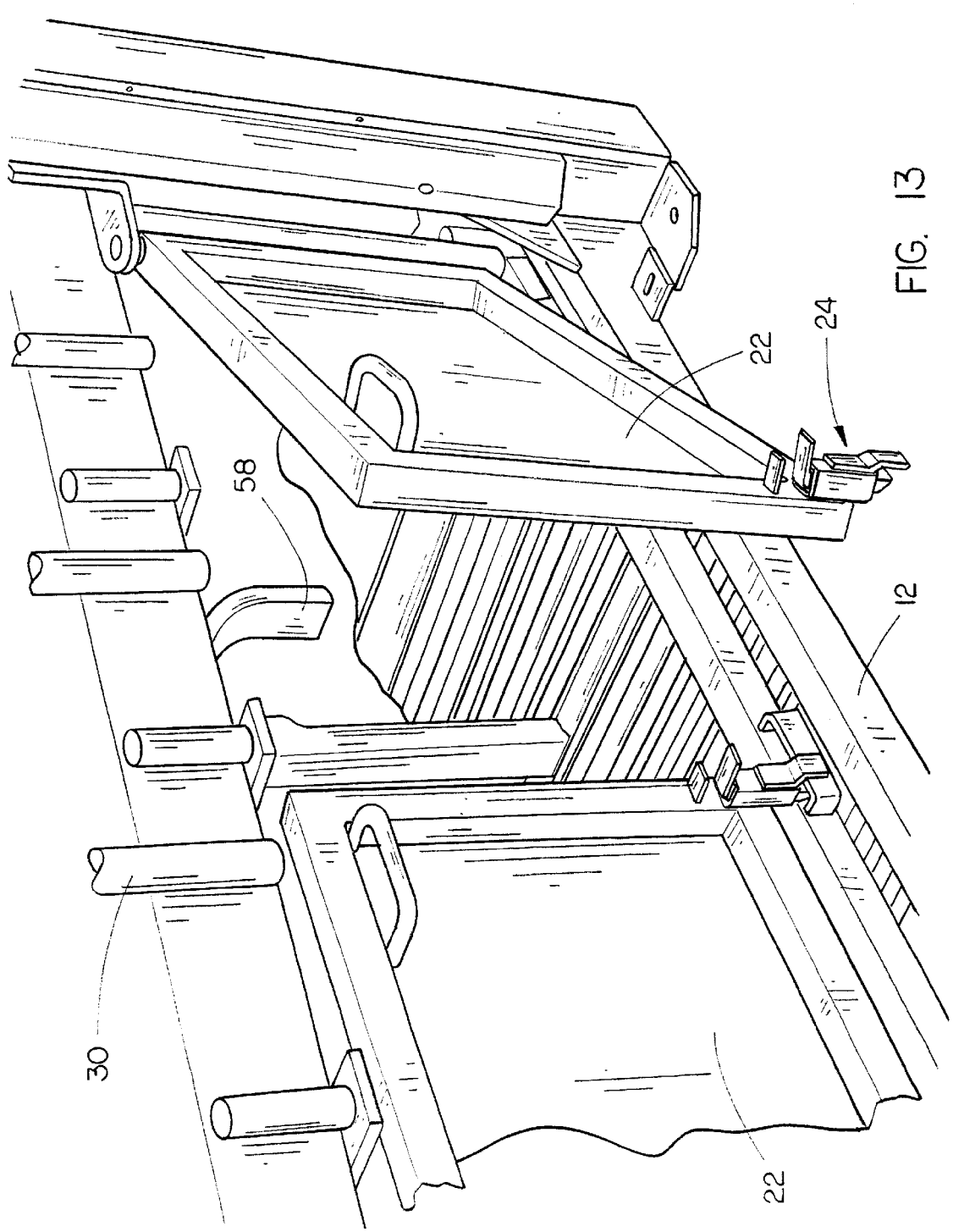
FIG. 13 is a perspective view of the lower side doors of the squeeze chute of the present invention.

Opposing sidewalls 20 and 20' are substantially similar in structure. Accordingly, only sidewall 20 will be structurally described herein. Sidewall 20 is generally rectangular in shape, having upper and lower ends and opposite sides. A plurality of horizontally spaced lower panels 22 are provided adjacent the lower end of sidewall 20, as illustrated by FIG. 13. Each lower panel 22 is manually pivotable about a generally vertical axis between open and closed positions to provide access to lower portions of the animal. A latch 24 is provided for selectively securing each lower panel 22 in their respective closed positions. The lower panels have planar inner surfaces 24 to avoid providing footholds for an animal positioned in the chute in the event that the animal attempts to exit the chute.

Figure 10:
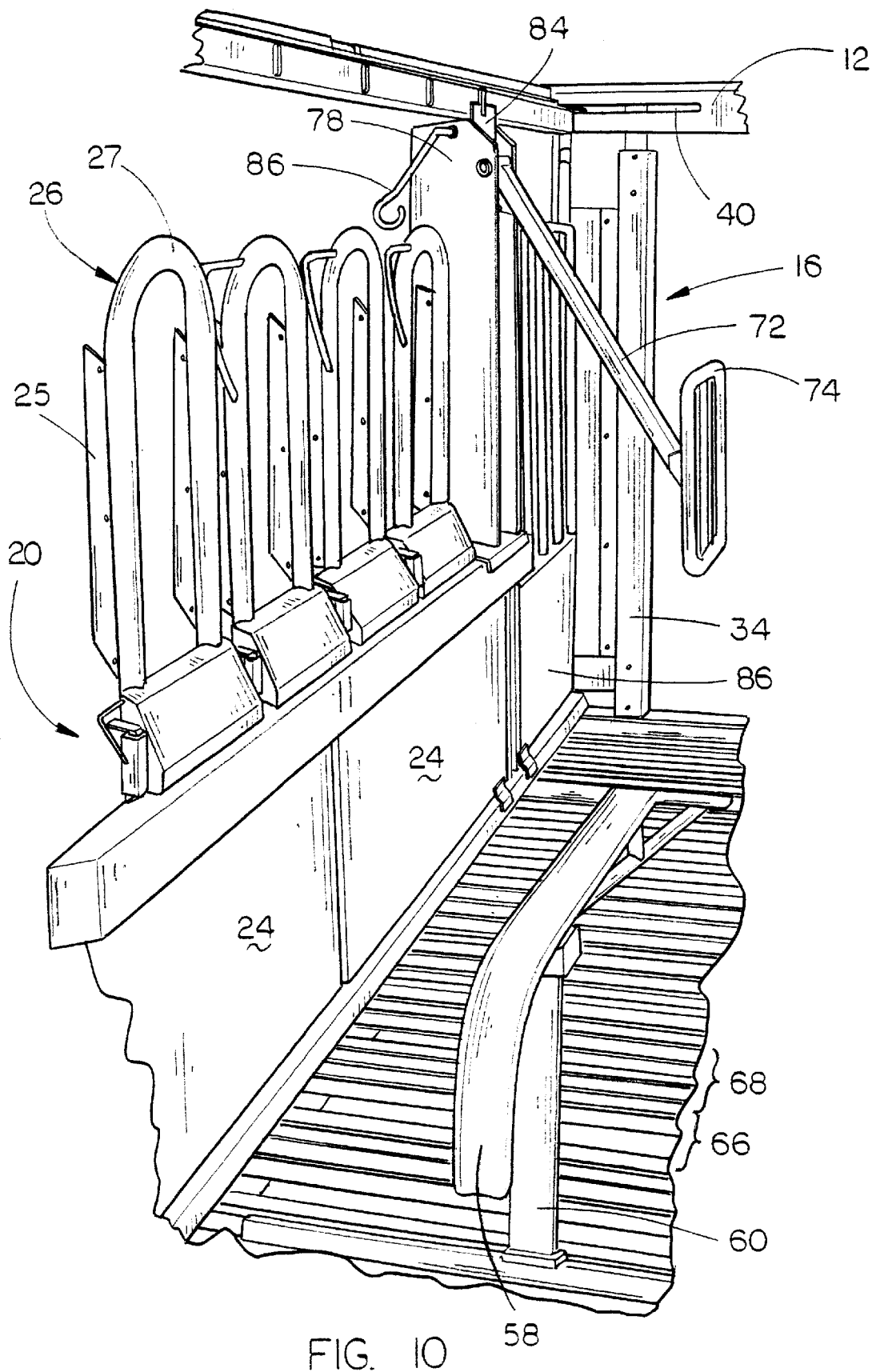
FIG. 10 is a front perspective view of the interior of the squeeze chute of the present invention.
Figure 14:
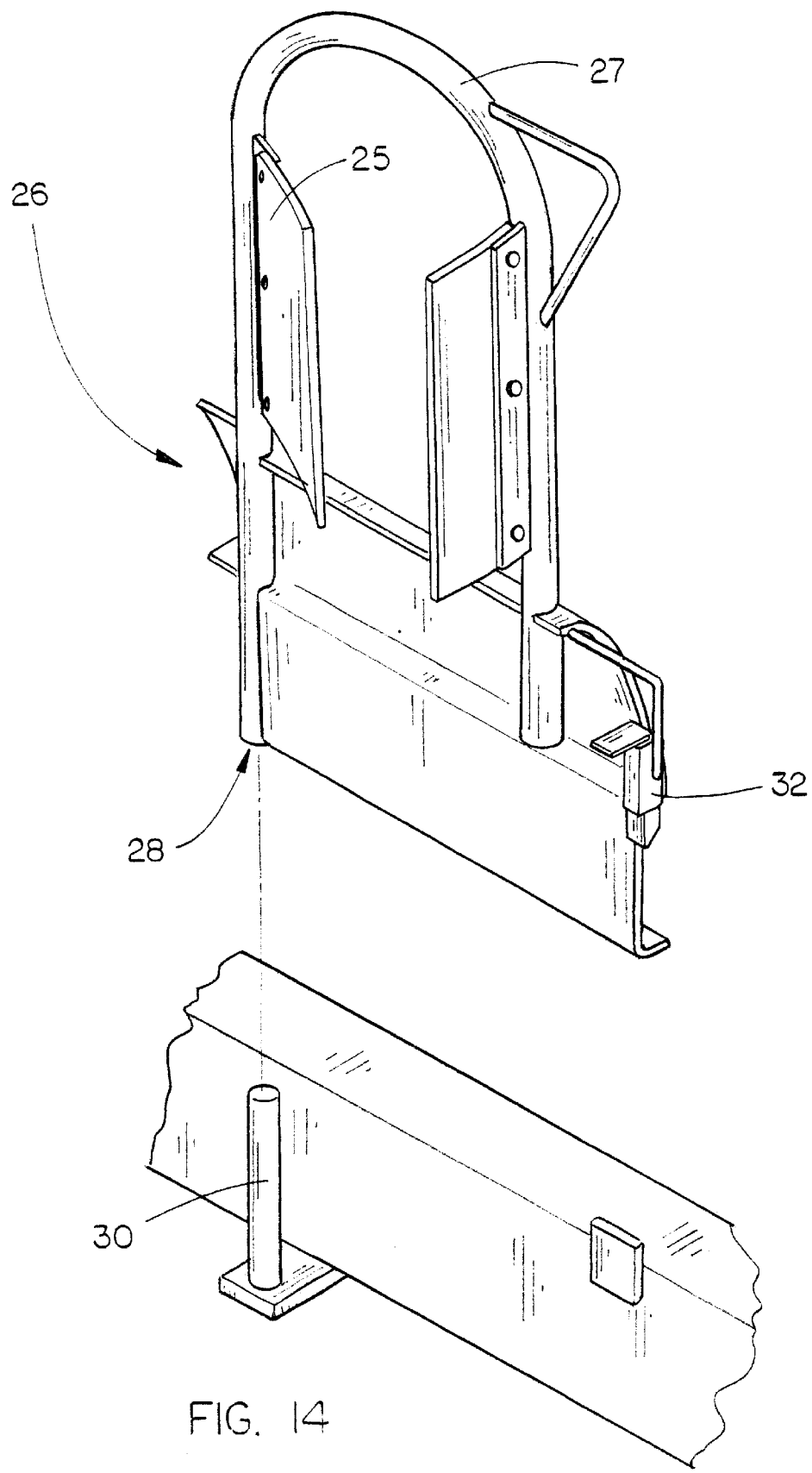
FIG. 14 is a perspective view of an upper sidewall door of the squeeze chute of the present invention and an associated mounting pin.

A plurality of horizontally spaced upper panels 26 are provided adjacent the upper end of sidewall 20, as illustrated by FIGS. 1, 10 and 14. The upper panels 26 are each generally comprised of an inverted, vertically oriented, U-shaped bar 27, which allows individuals working an animal positioned in the chute to remain outside the chute and reach the upper portions of an animal positioned in the chute. Flexible panels 25 are secured to each of the U-shaped bars 27 to cover the openings therein. It is preferred that only one side of the flexible panels 25 be secured to the U-shaped bars 27 to permit the operator to selectively move the panels aside and reach through the U-shaped bars 27. It is contemplated that one or more flexible panels 25 can be used with each U-shaped bar 27.

The lower ends of the U-shaped bars 27 have openings 28 formed therein, which are adapted to removably receive elongated mounting pins 30. The mounting pins 30 are secured to the sidewall 20 and extend generally vertically therefrom, so that each upper panel 26 can be removably secured to the sidewall 20. The upper panels are pivotable about the generally vertical axis of mounting pins 30 between open and closed positions. Each upper panel 26 is provided with a latch 32 to selectively retain the upper panels 26 in their respective closed configurations. The upper panels 26 thus selectively provide manual access to the upper portions of an animal positioned in the chute.

Figure 18:
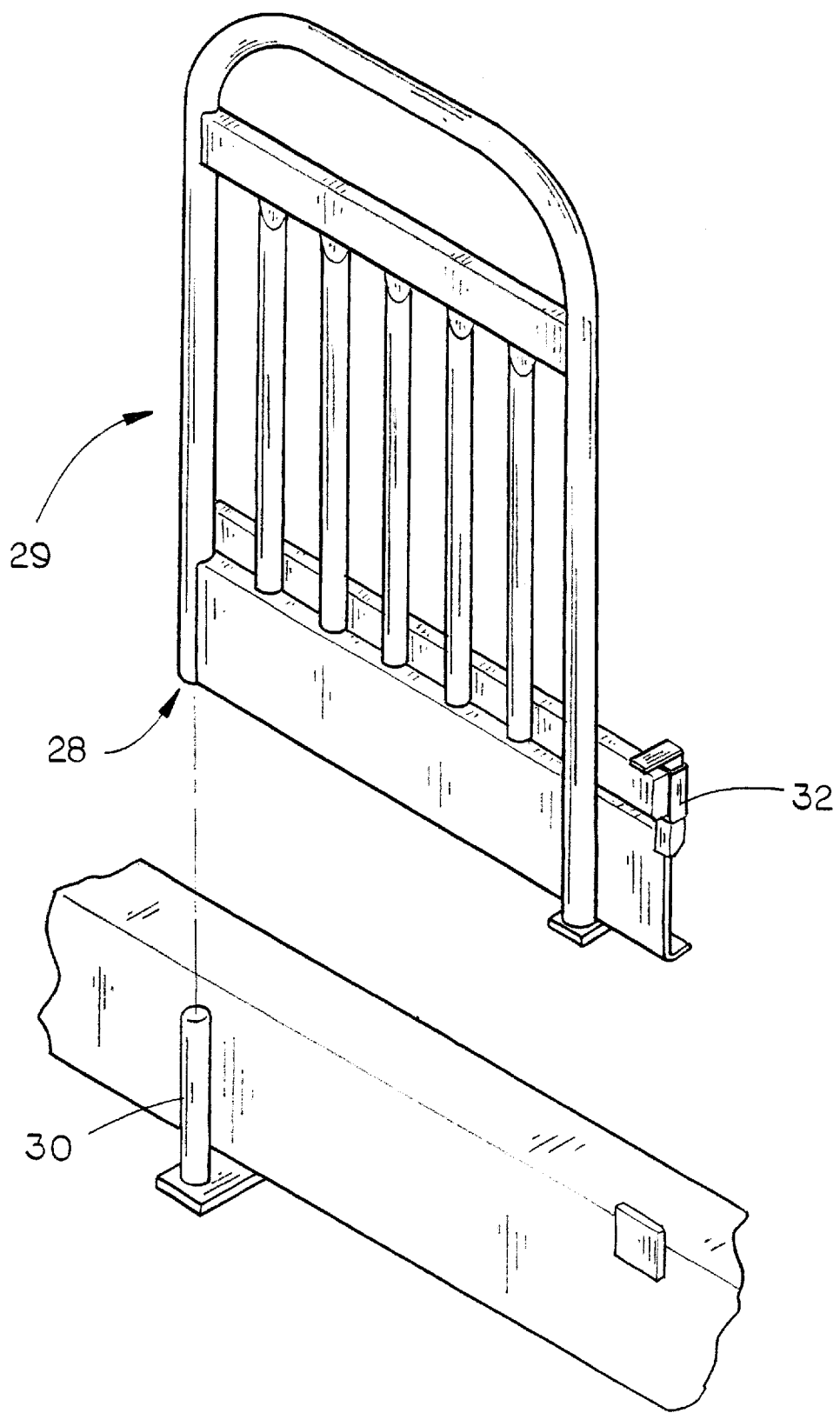
FIG. 18 is a perspective view of an alternate embodiment of an upper sidewall door of the squeeze chute of the present invention and an associated mounting pin.

In an alternate embodiment, shown in FIG. 18, the opposing sidewalls 20 and 20' could be provided with one or more upper panels 29. Preferably, the upper panels 29 are secured to the mounting pins of opposing sidewalls 20 and 20' in a manner similar to that of panels 26. Panels 29 primarily differ from panels 26 in that panels 29 are wider than panels 26 so that, when the panels 29 are secured adjacent to the exit end of chute 10, greater access is given to the animal's shoulder area for such procedures as vaccinations and the like. Due to the increased width of the U-shaped frame of panel 29, it is preferred that the opening formed therein be filled or covered with a plurality of rigid bars 31, rather than a single flexible panel 25. However, it is contemplated that a combination of rigid bars 31 and flexible panels 25 could be used to fill the opening. The panels 29 open and close in a manner similar to the panels 26 and are selectively latched to the opposing sidewalls 20 and 20' to prevent the panel 29 from freely opening due to movement by the animal.

Figure 3:
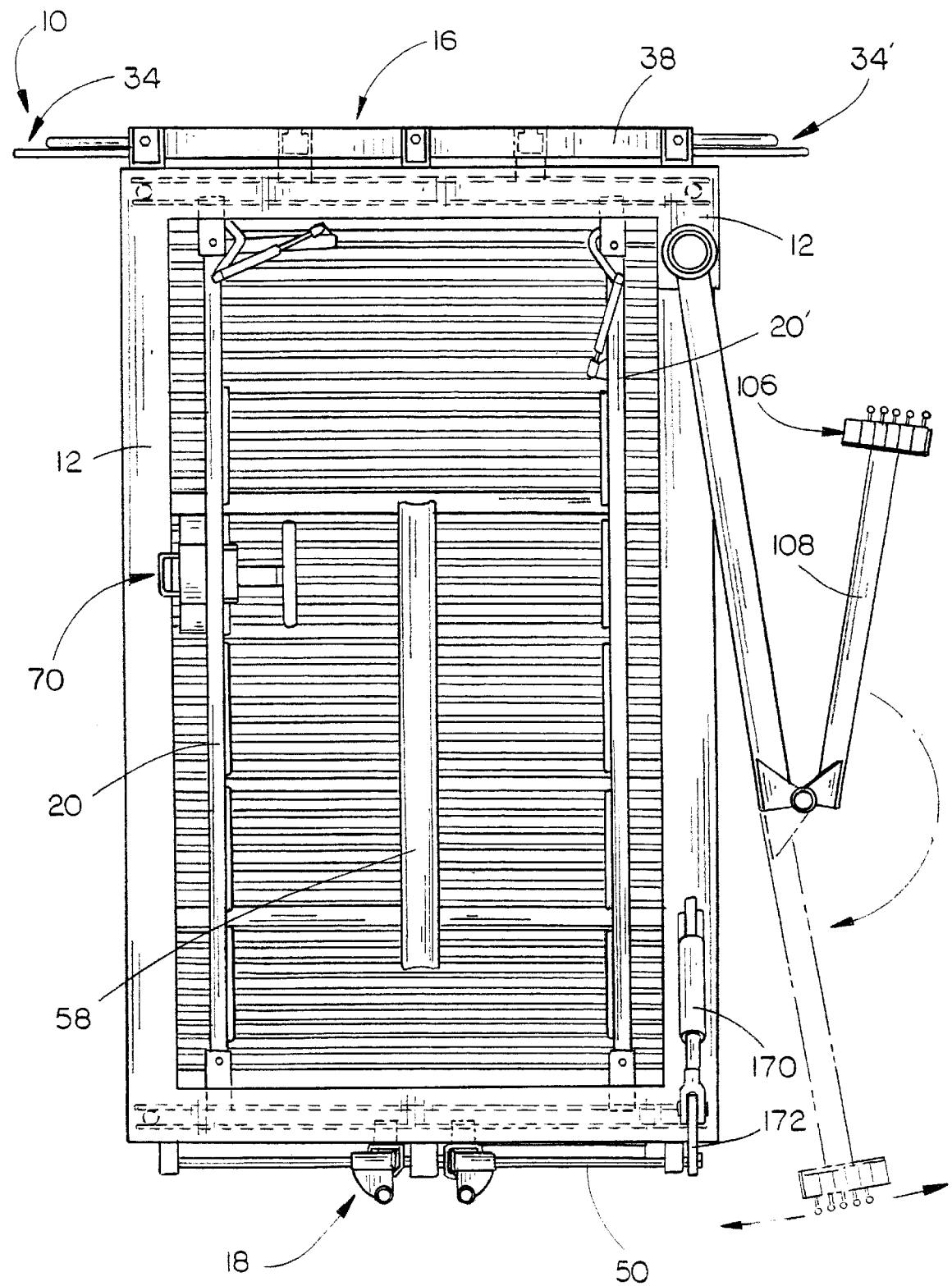
FIG. 3 is a plan view of the squeeze chute of the present invention.
Figure 6:
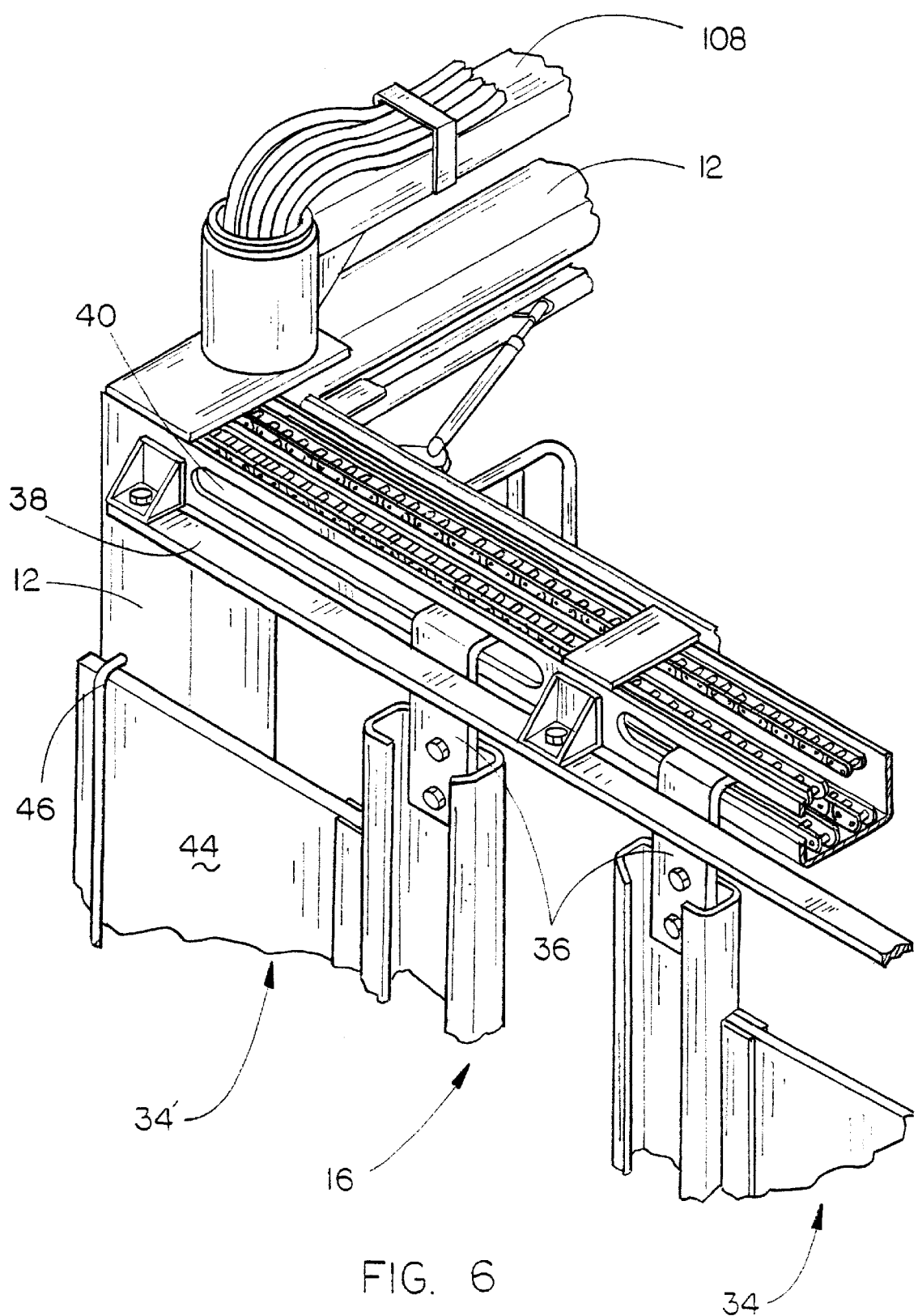
FIG. 6 is a partial perspective view of the entrance gate of the squeeze chute of the present invention and the associated upper horizontal chain-drive assembly.
Figure 7:
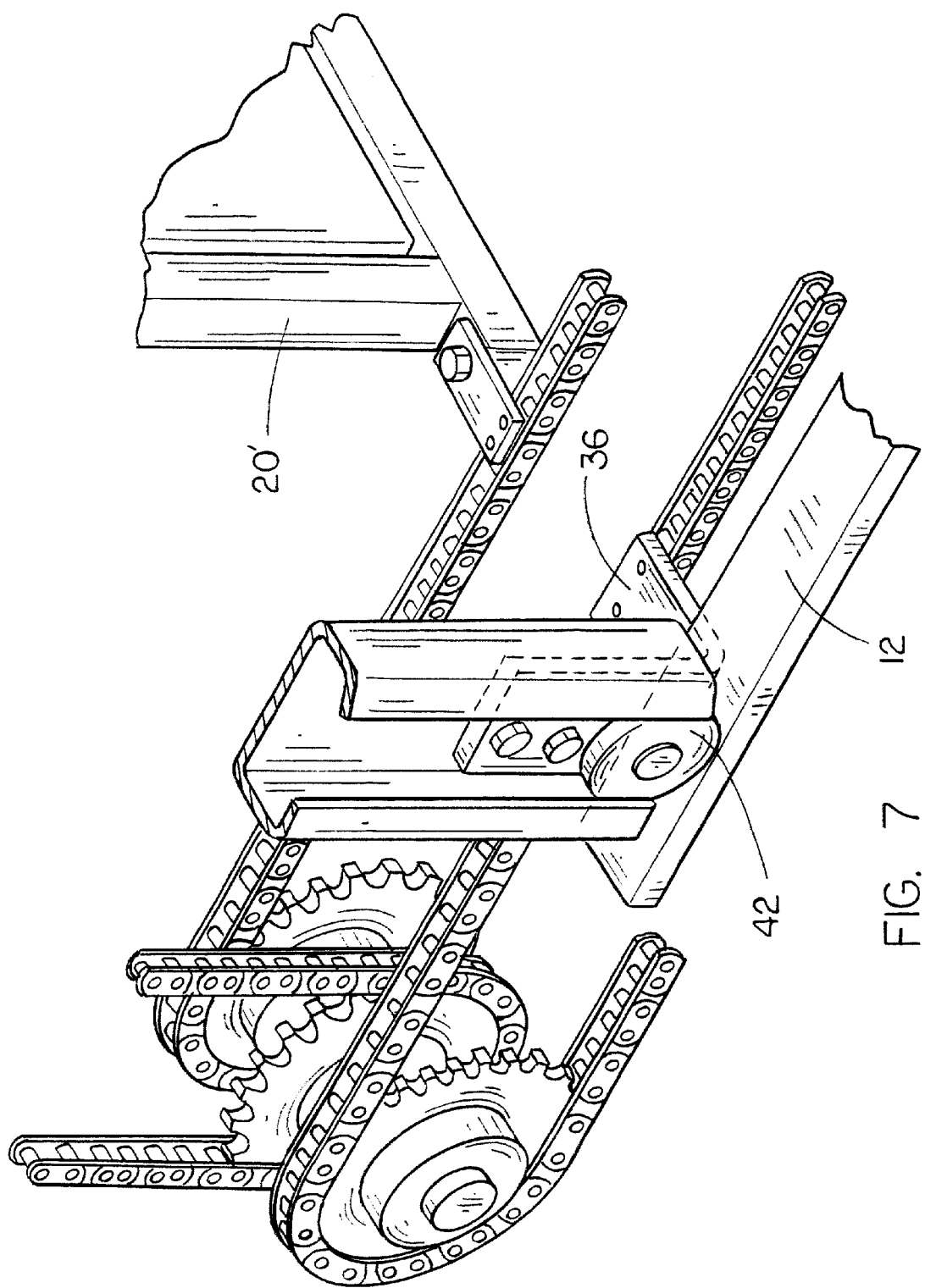
FIG. 7 is a partial perspective view of a lower horizontal chain-drive assembly of the squeeze chute of the present invention.
Figure 8:
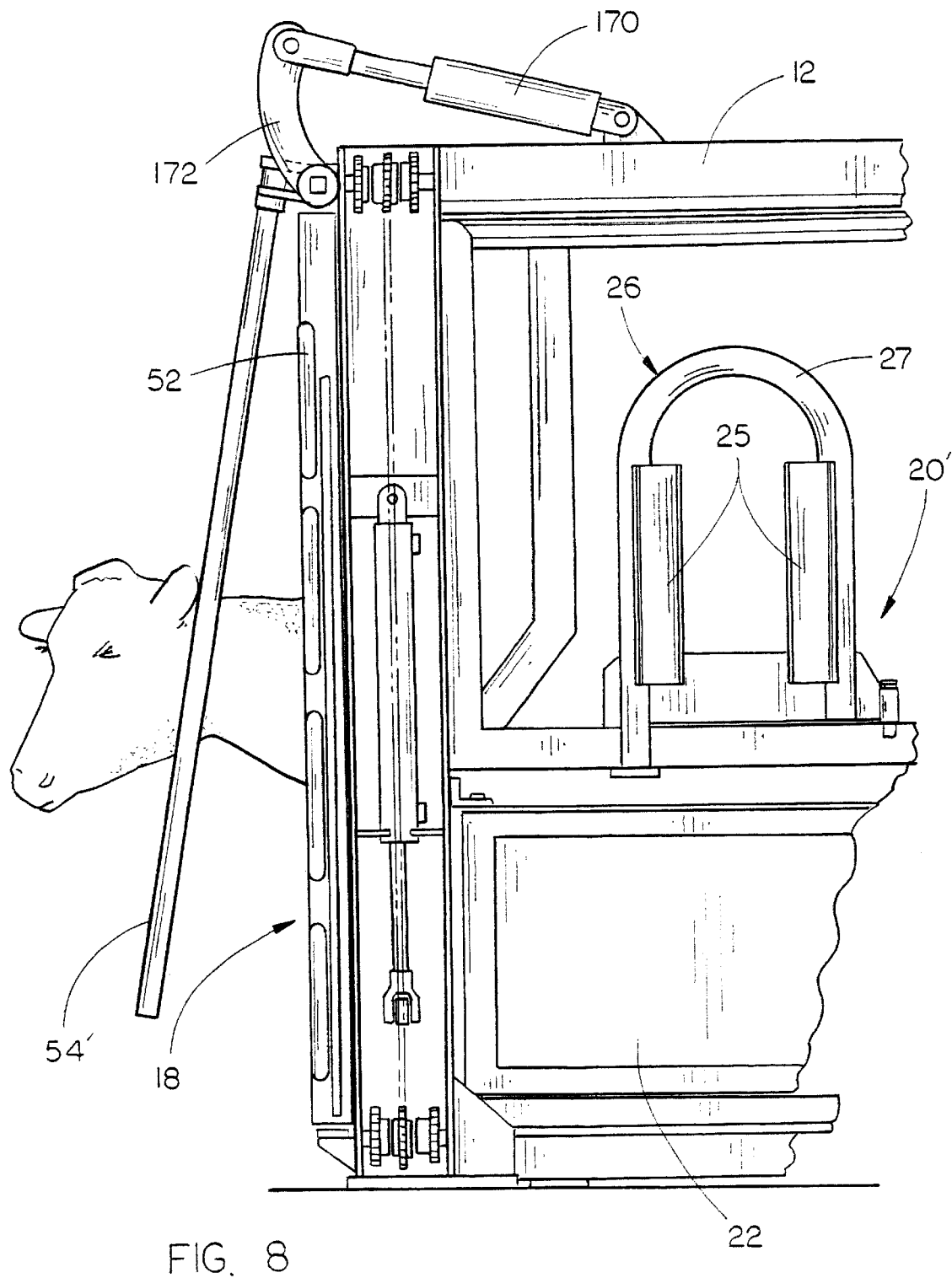
FIG. 8 is a side view of the neck extender of the squeeze chute of the present invention in an extended position.

An entrance gate 16 is provided at the entrance end of the chute 10, as illustrated by FIGS. 1, 3 and 6. Entrance gate 16 is selectively movable between open and closed positions to allow the animal to enter the chute 10 and prevent it from exiting rearwardly therefrom. The entrance gate 16 is generally comprised of a pair of cooperating entrance doors 34 and 34', which are interconnected so that they synchronously slide equally along a generally horizontal axis between the open and closed positions.

The entrance doors 34 and 34' are provided with upper and lower L-shaped tabs 36 for operatively, slidably connecting the upper ends of entrance doors 34 and 34' to the upper end of frame 12. Elongated, horizontally disposed brackets 38 retain the vertical portion of each tab 36, while an elongated slot 40 operatively receives the horizontal portion of each tab 36. The lower tabs 36 operatively and slidably connect the lower ends of entrance doors 34 and 34' to the lower end of frame 12. The bottom end of entrance doors 34 and 34' are provided with a roller 42, which is rotatably secured thereto. Rollers 42 operatively engage the lower portion of frame 12 to allow entrance doors 34 and 34' to smoothly slide between their respective open and closed positions.

Entrance doors 34 and 34' are further comprised of panels 44, which form the majority of the front and back surface area of entrance doors 34 and 34'. The opposite ends of panels 44 are operatively received by elongated, vertically disposed brackets 46, which are secured to the sides of frame 12. Brackets 46 help to guide entrance doors 34 and 34' between their respective open and closed positions and prevent the longitudinal movement of entrance doors 34 and 34' with respect to chute 10.

Figure 2:
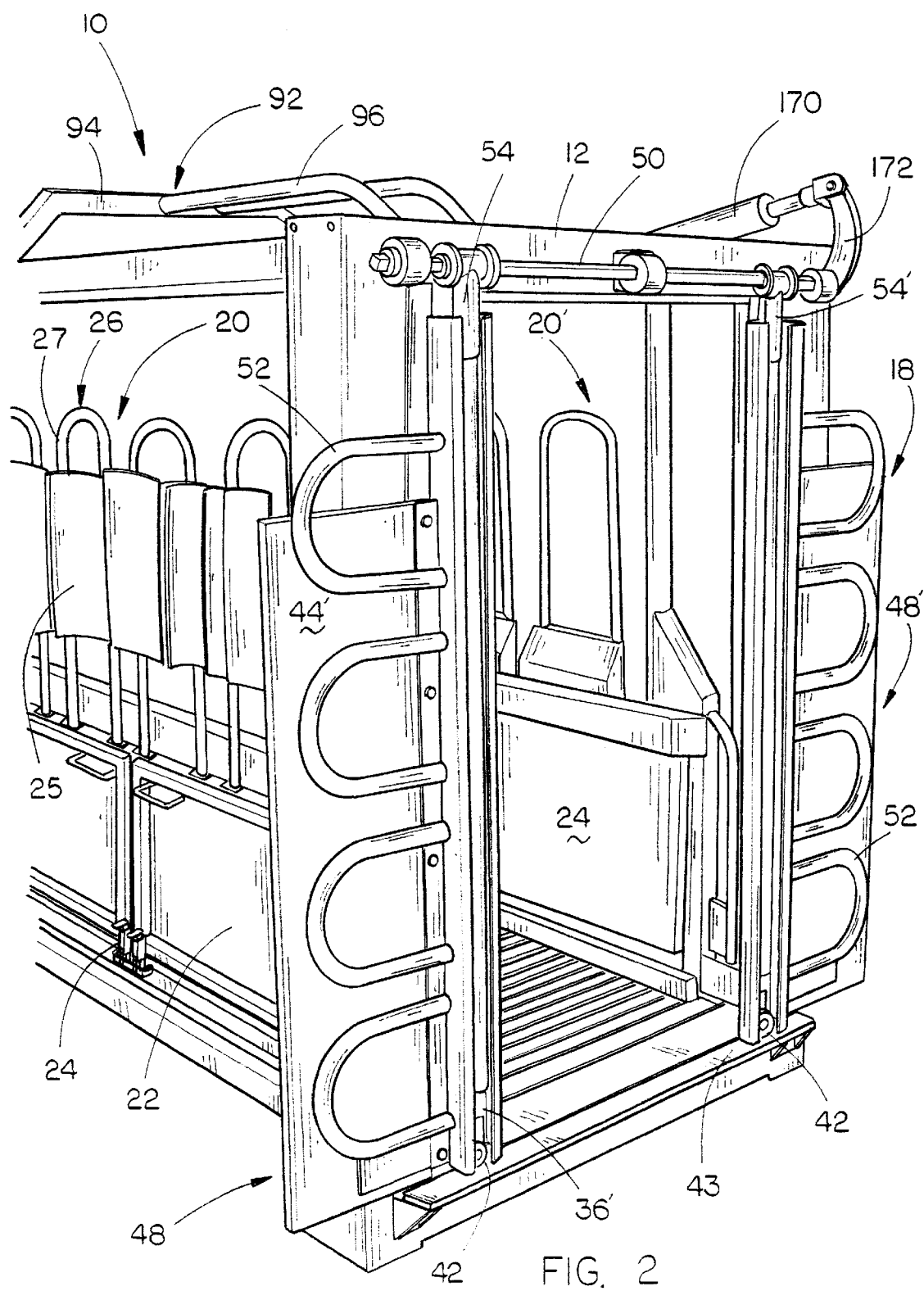
FIG. 2 is a front perspective view of the exit gate of the squeeze chute in an open position.
Figure 17:
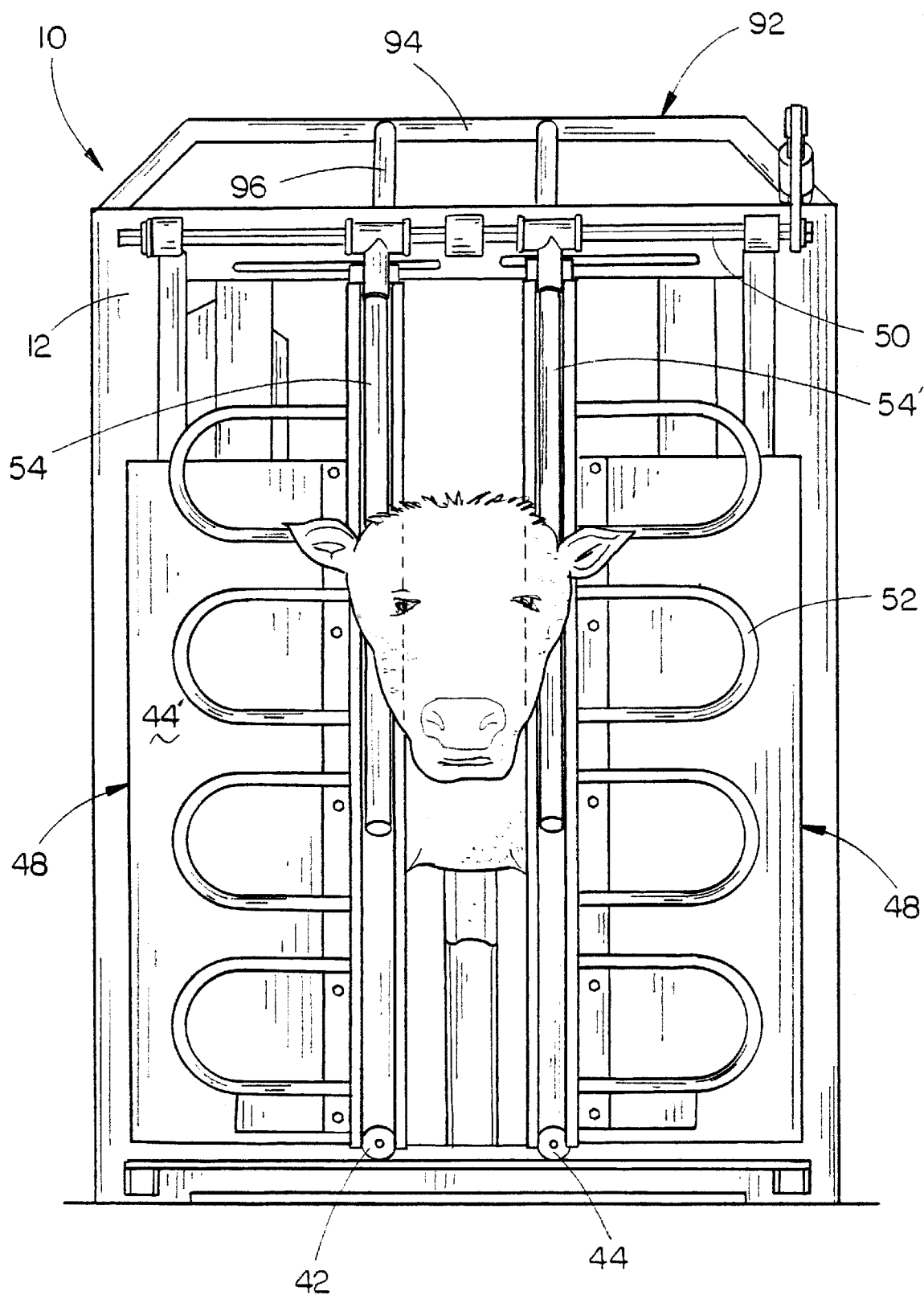
FIG. 17 is front elevation view of the exit gate of the squeeze chute of the present invention in a closed immobilizing position.

An exit gate 18 is provided at the exit end of the chute 10, as illustrated by FIGS. 2, 3 and 17. Exit gate 18 is selectively movable between open and closed positions to selectively permit and prevent at least the forward movement of the animal. The exit gate 18 is generally comprised of a pair of cooperating exit doors 48 and 48', which are interconnected so that they synchronously slide equally along a generally horizontal axis between the open and closed positions. The inner ends of exit doors 48 and 48' serve as a neck clamp, which is adapted to selectively abut opposing sides of an animal's neck, as illustrated by FIG. 17. In this closed position, the animal's forward and rearward movement is prevented and the animal can be safely worked.

The exit doors 48 and 48' are provided with upper and lower L-shaped tabs 36', which are substantially similar in structure and function to those used on entrance gate 16. The upper tabs 36' operatively and slidably connect the upper ends of exit doors 48 and 48' to the upper end of frame 12. An elongated, horizontally disposed mounting shaft 50 (discussed in further detail below) retains the vertical portion of each tab 36', while an elongated slot 40' operatively receives the horizontal portion of each tab 36'. The lower tabs 36' operatively and slidably connect the lower ends of exit doors 48 and 48' to the lower end of frame 12. The bottom end of exit doors 48 and 48' are provided with a roller 42', which is rotatably secured thereto. Rollers 42' operatively engage a platform 43 secured to the lower portion of frame 12 to allow entrance doors 48 and 48' to smoothly slide between their respective open and closed positions.

Exit doors 48 and 48' are further comprised of panels 44', which are structurally and functionally similar to panels 44 of entrance gate 16, that form the majority of the front and back surface area of entrance doors 48 and 48'. A plurality of vertically spaced, generally U-shaped members 52 are secured to the inner edges of exit gates 48 and 48' and extend outwardly therefrom, adjacent the front surface of exit gate 48 and 48'. U-shaped members 52 provide additional structural support to panels 44' to restrict the forward movement of the animal.

Figure 4:
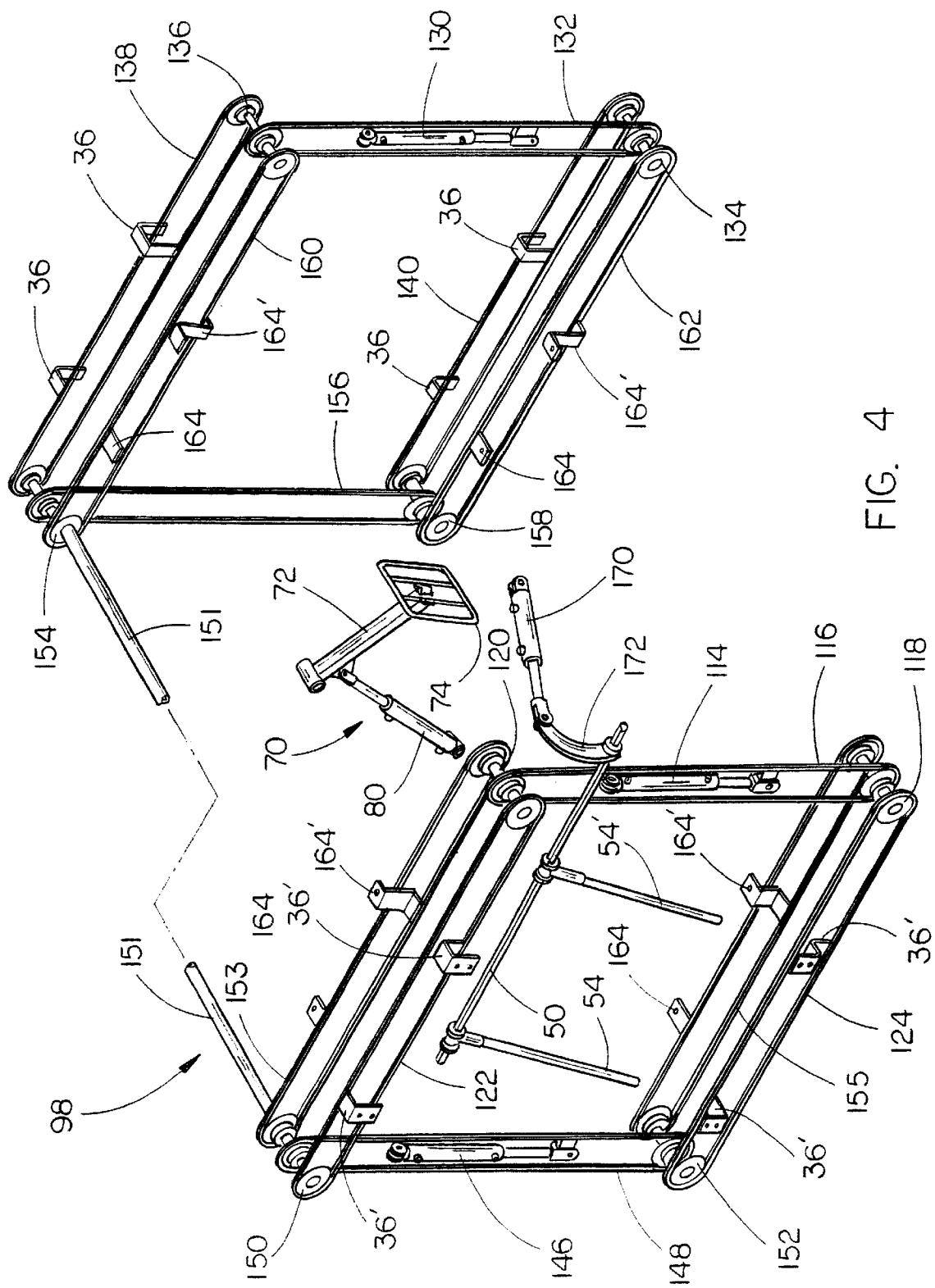
FIG. 4 illustrates the chain-drive system of the squeeze chute of the present invention.

Elongated neck-stretchers 54 and 54' are pivotally, slidably secured to mounting shaft 50, adjacent the top portion of the exit gate 18 and extend in a generally downward direction along the inner edges of exit doors 48 and 48'. When the exit gate 18 is in its closed position, the neck-stretchers 54 and 54' can be arcably pivoted between extended and retracted positions. As the neck stretchers 54 and 54' extend, they engage the lower rearward portion of the animal's head and extend the same in an upward and outward direction to immobilize the animal's head in an operable position. Neck-stretchers 54 and 54' can be secured to mounting shaft 50 so that neck-stretchers 54 and 54' extend generally perpendicularly from the longitudinal axis of mounting shaft 50, as shown in FIGS. 2, 4 and 17. In an alternate embodiment, however, mounting brackets 55 and 55' are used to secure neck-stretchers 54 and 54' to mounting shaft 50 so that, while neck-stretchers 54 and 54' extend generally perpendicularly to mounting shaft 50, they are offset a short distance "x" from the longitudinal axis of mounting shaft 50. In this off-set position, the arc traversed by neck-stretchers 54 and 54' is broadened somewhat. The distance "x" to which the neck-stretchers 54 and 54' are off-set can be varied according to the breadth of arcing motion desired.

Figure 12:
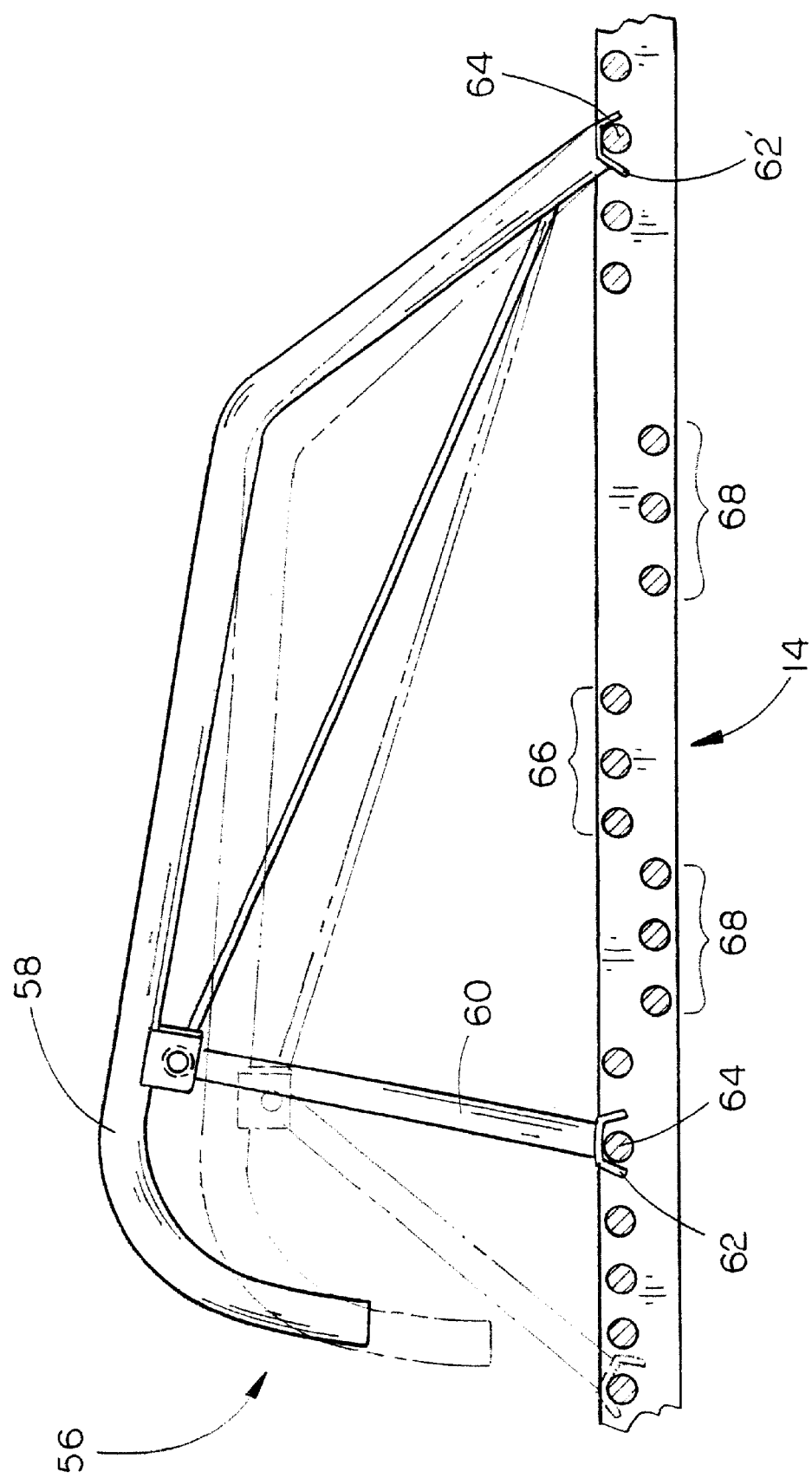
FIG. 12 is side elevation view of the abdomen support of the squeeze chute of the present invention.

An elongated abdomen support 56 is provided intermediate the entrance and exit gates, as illustrated in FIGS. 3, 10 and 12. Abdomen support 56 is comprised of a generally angular elongated beam 58, having first and second ends, and an elongated, generally vertically disposed support 60. The support 60 is pivotally connected to beam 58 adjacent the first end thereof. The opposite end of support 60 and the second end of beam 58 are provided with generally U-shaped collars 62 and 62', which are adapted to be removably secured to the base 14. The height of abdomen support 56 is adjusted by operatively engaging support 60 at different angles with respect to base 14. When support 60 is substantially vertically disposed, abdomen support 56 will be at its maximum height from base 14 to accommodate larger animals. As the angle of support 60 with respect to base 14 is decreased, the height of abdomen support 56 with respect to base 14 will proportionately decrease to support smaller animals.

Base 14 is preferably comprised of a plurality of separate floor panels that are adapted to be removably connected to the lower end of frame 12 so that each such panel may be removed or interchanged. The individual panels are preferably comprised of a plurality of elongated bars 64, extending transversely to frame 12, in horizontally spaced relation to one another. It is further preferred that the elongated bars 64 be arranged in vertical spaced relation to one another to form alternating upper and lower traction steps 66 and 68. The traction steps 66 and 68 provide the animal with the necessary traction to move through the chute in wet or muddy conditions. The removable feature of each base panel allows the operator vary the number of traction steps, if any, along the length of base 14.

At least one hip-immobilizing arm 70 can be removably secured to one of the sidewalls 20 or 20', as illustrated in FIGS. 3, 10, 11 and 16. The immobilizing arm 70 is comprised of an elongated arm 72, having an engaging member 74 pivotally secured at one end thereof. The opposite end of arm 72 is pivotally secured to a first pin 76 within mounting box 78. Cylinder 80 is rotatably secured at one end to arm 72 and rotatably secured at its opposite end to a second mounting pin 82 within mounting box 78. Mounting box 78 is further comprised of a mounting sleeve, which is adapted to removably receive any of the mounting pins 30 along sidewalls 20 or 21'. Latch 84 is provided adjacent the top of mounting box 78 to releasably secure mounting box 78 to sidewall 20 or 20', adjacent the top end thereof. Lever 86 is provided for engaging and releasing latch 84.

Figure 9:
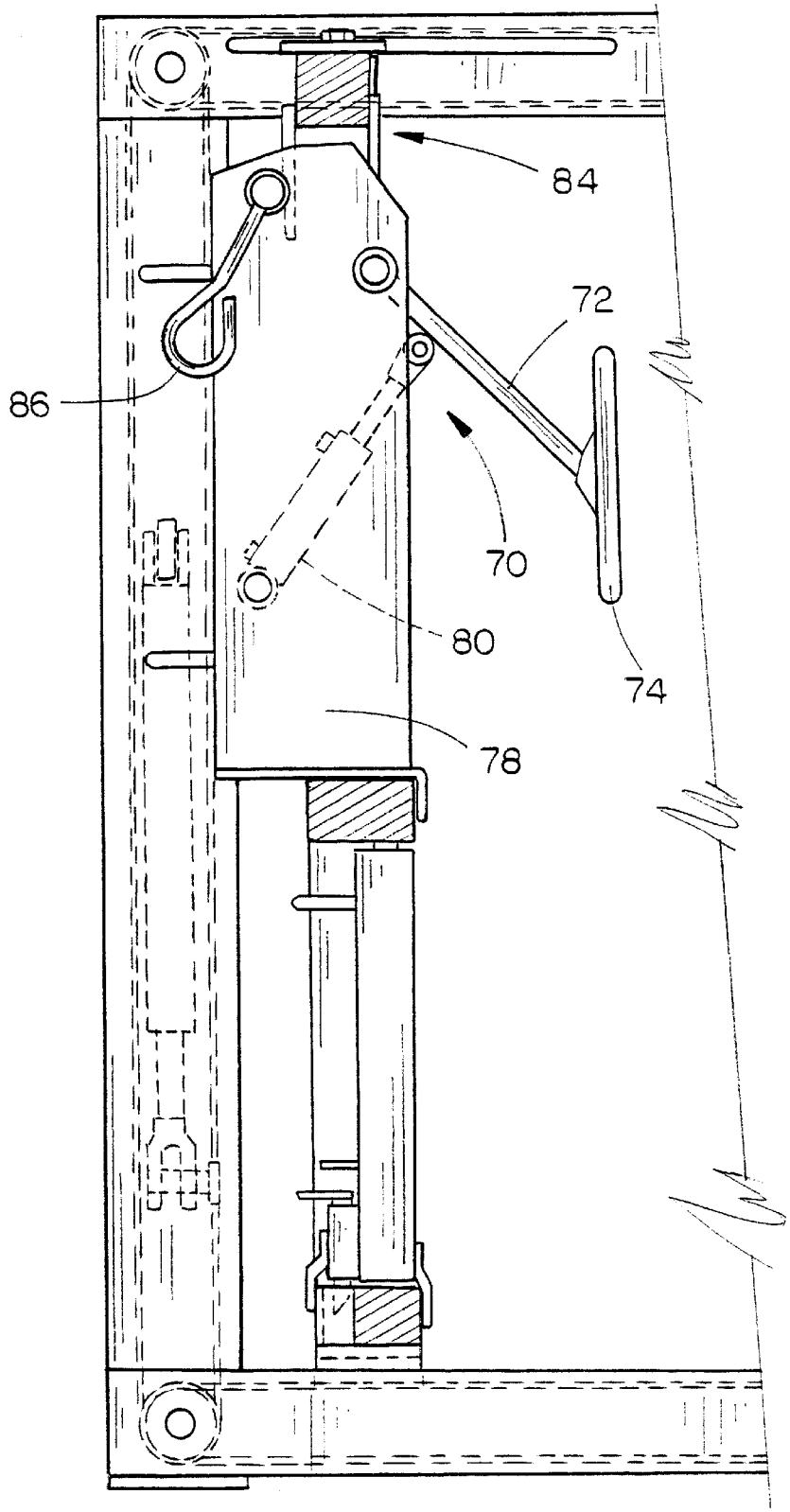
FIG. 9 is a side view of the hip immobilizer of the squeeze chute of the present invention in an extended position.
Figure 11:
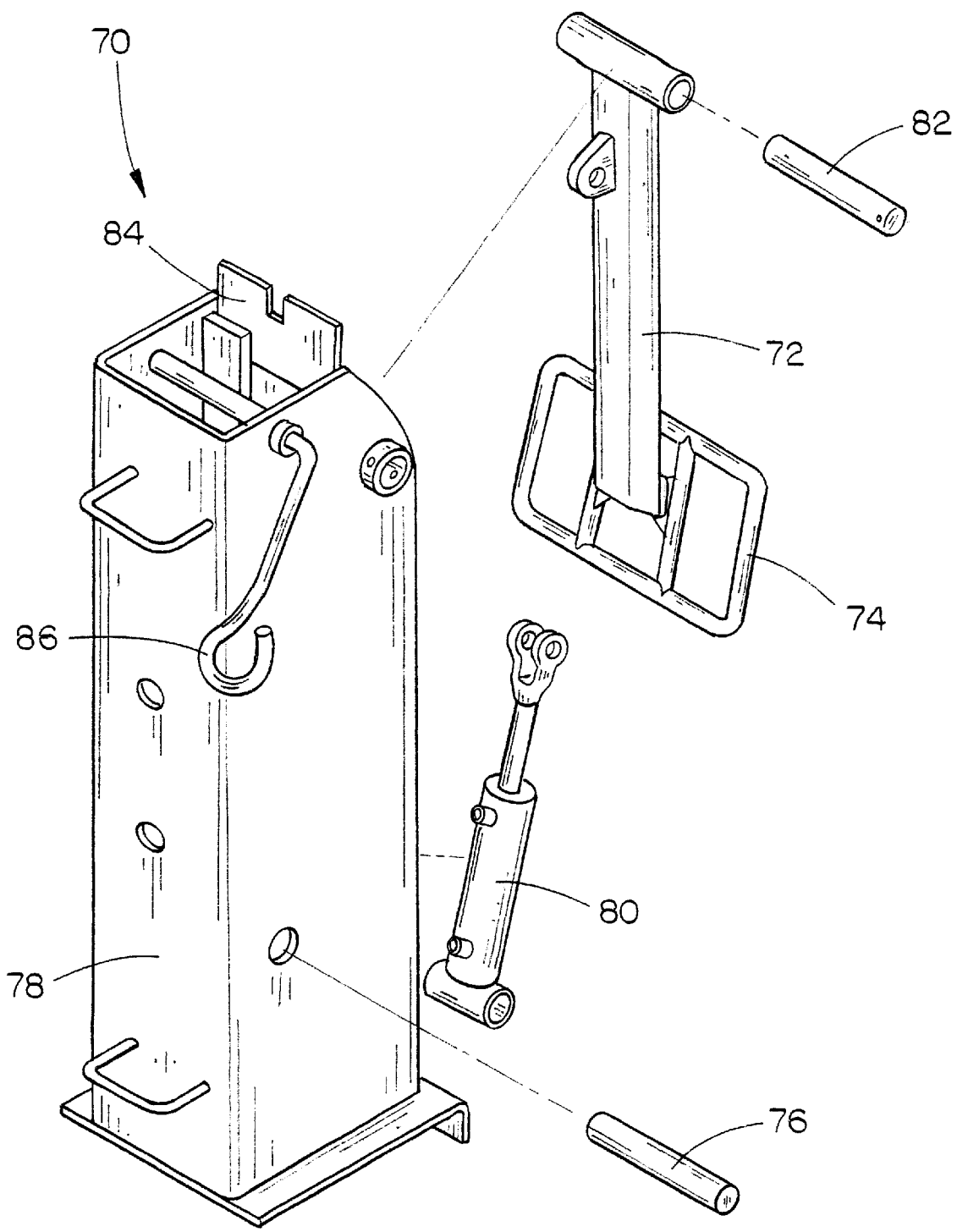
FIG. 11 is an exploded view of the hip immobilizer of the squeeze chute of the present invention.
Figure 15:
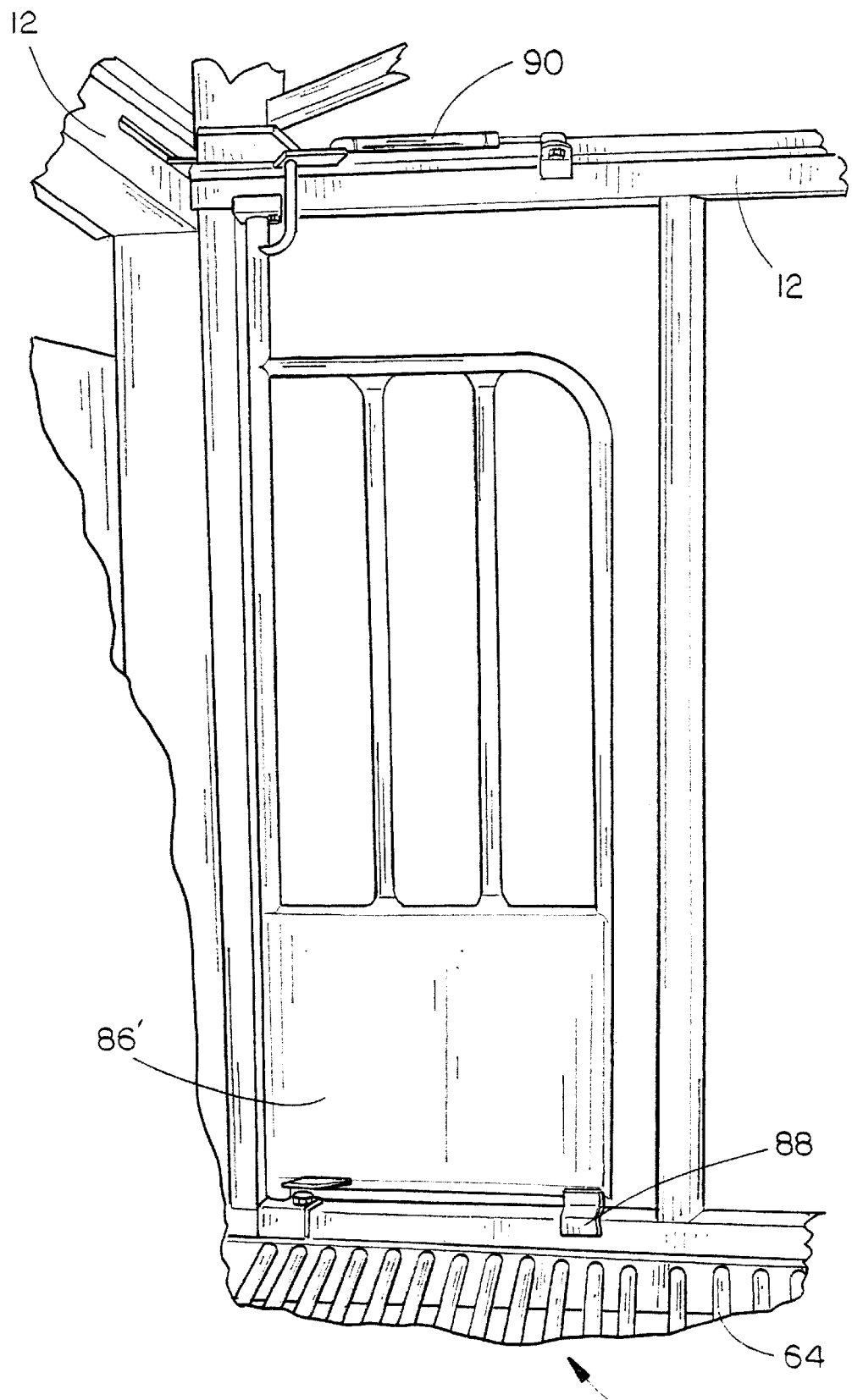
FIG. 15 is a side elevation view of a rear access door of the squeeze chute of the present invention.
Figure 16:
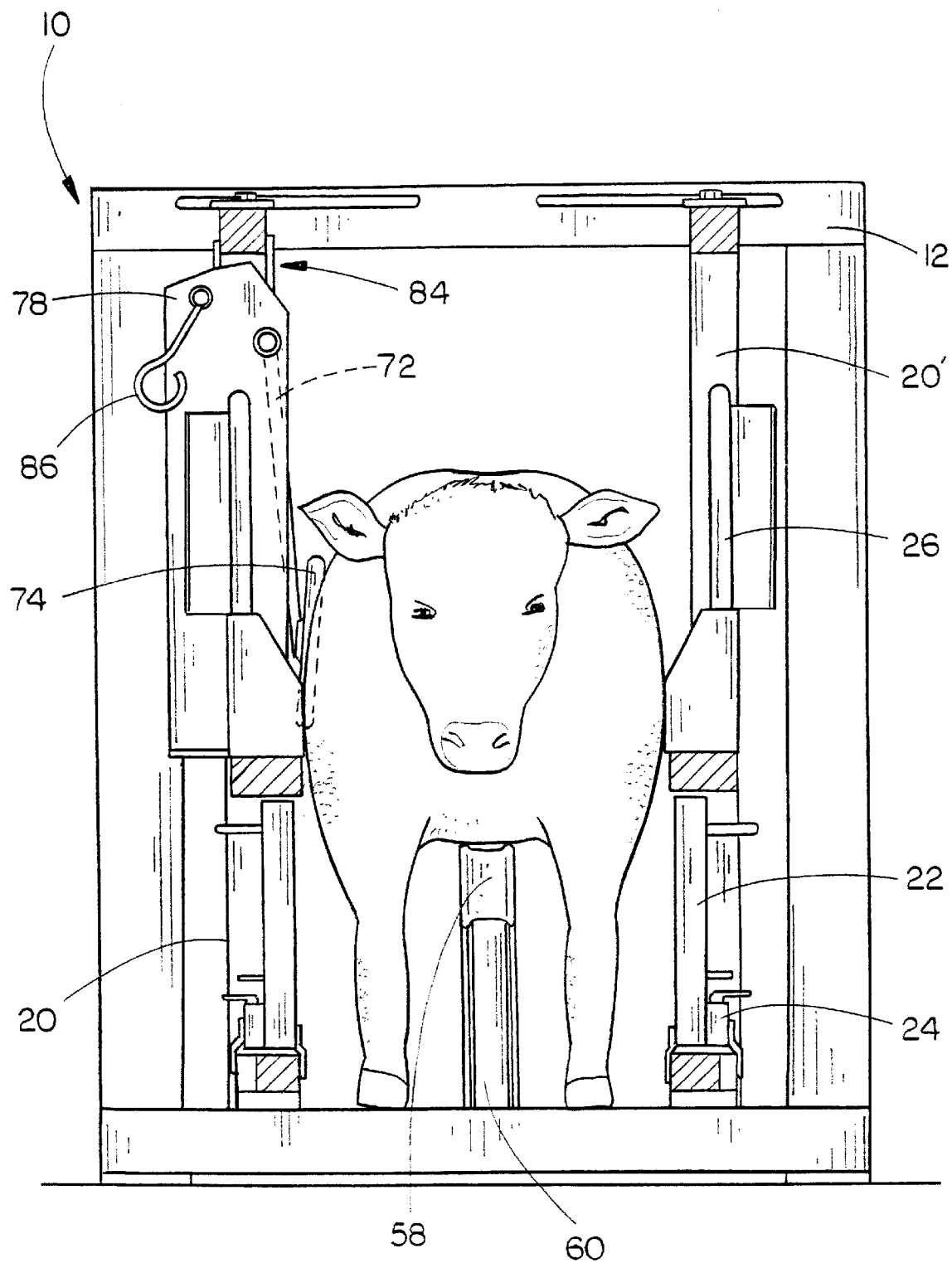
FIG. 16 is a front elevation view of the squeeze chute of the present invention illustrating the operation of the hip immobilizing arm.

The immobilizing arm 70, illustrated by FIGS. 9, 10 and 11, can be selectively moved between extended and retracted positions. In its extended position, immobilizing arm 70 selectively engages the animal, adjacent the animal's hip for immobilizing the same, FIG. 16. In the immobilized position, the operator can enter the chute through either of rear access doors 86 or 86', illustrated in FIGS. 1, 10 and 15, to perform various operations at the rear of the animal. Rear access doors 86 and 86' are provided with tabs 88 at their lower ends to prevent the doors 86 and 86' from opening outwardly. Pistons 90 are provided at the upper end of doors 86 and 86', which automatically move the doors 86 and 86' to their closed positions. Once the operator has exited the chute 10 through rear access door 86 or 86', immobilizing arm 70 can be retracted to allow the animal's hip area to freely move transversely with respect to the chute 10.

An anti-rear device 92 is provided along the top of the chute 10, adjacent the exit end thereof. It is preferred that the anti-rear device 92 be provided with at least one elongated transverse bar 94 and at least one elongated longitudinal bar 96. FIGS. 1 and 2 illustrate one embodiment of the anti-rear device 92, which comprises a single transverse bar 94 extending between the sides of frame 12 and two longitudinal bars 96 extending from the middle of transverse bar 94 to the exit end of frame 12. This configuration of anti-rear bars prevents the animal from attempting to climb out of the top of the chute 10.

Figure 5:
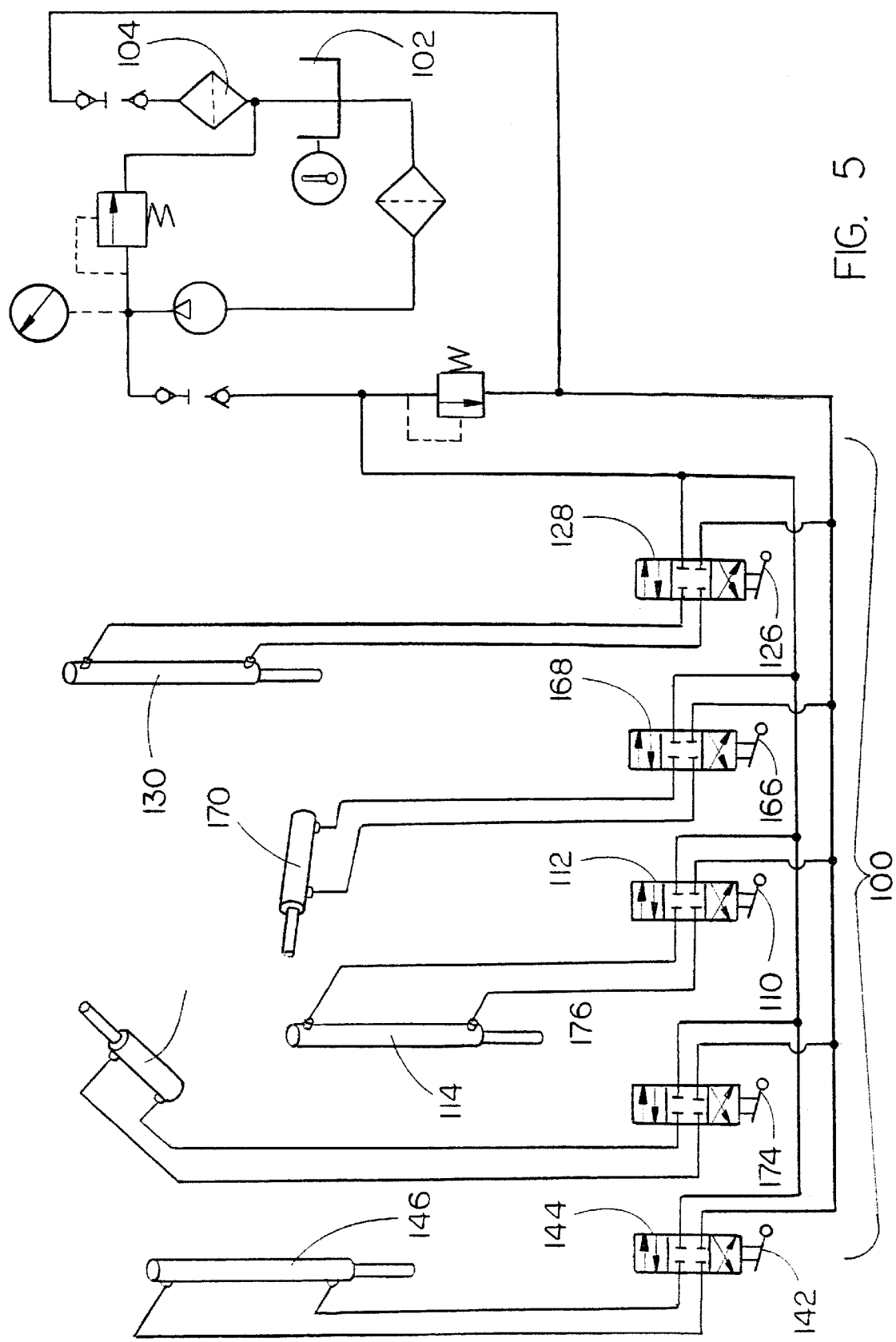
FIG. 5 is a schematic of the hydraulic assembly of the squeeze chute of the present invention.

The movement of entrance gate 14, exit gate 16, sidewalls 20 and 20', neck stretchers 54 and 54', and hip-immobilizing arm 70, is preferably provided by a hydraulically powered roller chain assembly system 98, illustrated by FIGS. 4 and 5. The hydraulic pump is powered by an electric motor or gas engine (not shown), sufficient to generate approximately 700 psi of hydraulic pressure to a valve bank 100. Hydraulic pressure that is not used is returned to the hydraulic reservoir 102 through a filter head 104.

The valve bank 100 is comprised of six valves. Six individual levers, displayed on a central control panel 106, manipulate the valves. For ease of operation, the control panel 106 is disposed at the end of a segmented boom 108. The boom 108 is pivotally secured to the top of frame 12 so that the operator can move the control panel 106 to any location around the chute 10.

Entrance gate 16 is moved between open and closed positions through the manipulation of a first lever 110. By pulling the first lever 110, a first valve 112 is activated and hydraulic pressure is directed to a cylinder 114, causing the cylinder 114 to retract. Cylinder 114 is coupled to a vertically disposed roller chain 116, which extends between two double sprockets 118 and 120. Double sprockets 118 and 120 are coupled to horizontally disposed roller chains 122 and 124. Horizontal roller chain 122 is disposed along the top of the chute 10, adjacent the entrance gate 16. Horizontal roller chain 124 is disposed along the bottom of the chute 10, adjacent the entrance gate 16. As the cylinder 114 retracts, the vertical roller chain 116 rotates double sprockets 118 and 120, which rotate horizontal roller chains 122 and 124. Horizontal roller chains 122 and 124 are each connected to L-shaped tabs 36 that guide entrance doors 34 and 34' between their open and closed positions. Accordingly, as horizontal roller chains 122 and 124 rotate, the entrance gate 16 is moved to its open position. When the first lever 110 is pushed in the opposite direction, the aforementioned cycle is reversed, and the entrance gate 16 is moved to its closed position.

Exit gate 18 is moved between open and closed positions through the manipulation of a second lever 126. By pulling the second lever 126, a second valve 128 is activated and hydraulic pressure is directed to cylinder 130, causing the cylinder 130 to retract. Cylinder 130 is coupled to a vertically disposed roller chain 132, which extends between double sprockets 134 and 136. Double sprockets 134 and 136 are coupled to horizontally disposed roller chains 138 and 140. Horizontal roller chain 138 is disposed along the top of the chute 10, adjacent the exit gate 18. Horizontal roller chain 140 is disposed along the bottom of the chute 10, adjacent the exit gate 18. As cylinder 130 retracts, vertical roller chain 132 rotates double sprockets 134 and 136, which rotate horizontal roller chains 138 and 140. Horizontal roller chains 138 and 140 are each connected to L-shaped tabs 36' that guide exit doors 48 and 48' between their open and closed positions. Accordingly, as horizontal roller chains 138 and 140 rotate, the exit gate 18 is moved to its open position. When the second lever 126 is pushed in the opposite direction, the aforementioned cycle is reversed, and the exit gate 18 is moved to its closed position.

The synchronous positioning of opposing sidewalls 20 and 20' is controlled through the manipulation of a third lever 142. By pulling the third lever 142, a third valve 144 is activated and hydraulic pressure is directed to a cylinder 146, causing the cylinder 146 to retract. Cylinder 146 is coupled to a vertically disposed roller chain 148, which extends between upper and lower double sprockets 150 and 152. Double sprockets 150 and 152 are coupled to horizontally disposed roller chains 153 and 155. The upper double sprocket 150 is pinned to a drive shaft 151 that extends to the right rear corner of chute 10 and is pinned to double sprocket 154. Vertical roller chain 156 is coupled to double sprocket 154 at one end and double sprocket 158 at the opposite end. Double sprockets 154 and 158 are coupled to horizontally disposed roller chains 160 and 162. Horizontal roller chains 153, 155, 160 and 162 are each connected to a pair of tabs 164 and 164' that are coupled to opposing sidewalls 20 and 20'. Accordingly, as the horizontal roller chains rotate, the opposing sidewalls 20 and 20' are moved outwardly. When the third lever 142 is pushed in the opposite direction, the aforementioned cycle is reversed, and the opposing sidewalls 20 and 20' are moved inwardly.

By pulling a fourth lever 166, which is attached to a fourth valve 168, hydraulic pressure is directed to a fourth cylinder 170, causing the same to retract. The fourth cylinder 170 is coupled to an arm 172 that is attached to mounting shaft 50. The retraction of the fourth cylinder 170 causes the mounting shaft 50 to rotate. As described previously, the neck stretchers 54 and 54' pivot arcably with the rotation of mounting shaft 50. Accordingly, as the fourth cylinder 170 retracts, neck stretchers 54 and 54' extend arcably from the chute 10. When the fourth lever 170 is pushed in the opposite direction, the aforementioned cycle is reversed, and the neck stretchers 54 and 54' are retracted toward the chute 10.

By pushing a fifth lever 174, which is attached to a fifth valve 176, hydraulic pressure is directed to a fifth cylinder 80, causing the same to retract. The fifth cylinder 80 is coupled to arm 72 that is hinged in mounting box 78. As the fifth cylinder 80 retracts, arm 72 extends outwardly into the chute 10. When the fifth lever 174 is pushed in the opposite direction, the aforementioned cycle is reversed, and the arm 72 is retracted inwardly.

A sixth lever/valve assembly (not pictured) is provided as a spare that can be coupled to any of the cylinders in the event that one of the first through fifth lever/valve assemblies fails mechanically.

It is contemplated that several motive systems, other than a hydraulic chain drive assembly, could be employed by the squeeze chute 10. For example, the hydraulic pump, valves, and cylinders could readily be replaced with one or more electric or gas powered motors or pneumatic pistons that could be operated by the control panel 106. Manual power, employed through pivoting or rotary lever arms could also be used in place of the aforementioned power sources.

It is further contemplated that belts, comprised of nearly any material such as metal, rubber, plastic or other synthetic material, could be used in place of the aforementioned roller chains. Alternatively, a simple system of lever arms could be pivotally secured between the aforementioned power sources and the gates 16 and 18, opposing sidewalls 20 and 20', neck stretchers 54 and 54', and immobilizing arm 70, in place of the previously described roller chains and double sprockets. The opposing sidewalls 20 and 20' could also be simultaneously operated without drive shaft 151. In that instance, an additional power source such as a hydraulic cylinder, electric or internal combustion motor, or pneumatic piston, would be coupled with vertical roller chain 156, or aforementioned alternative.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

We claim:

1. A device for working livestock, comprising:
   an elongated frame having upper and lower ends and entrance and exit ends;
   an elongated generally horizontal base; said base being operatively secured to said frame adjacent the lower end thereof;
   an entrance gate operatively secured to said frame at said entrance end thereof; said entrance gate being adapted to move between open and closed positions generally transversely with respect to said frame;
   an exit gate operatively secured to said frame at said exit end thereof; said exit gate being adapted to move between open and closed positions generally transversely with respect to said frame;
   opposing sidewalls operatively movably secured to said frame between the entrance and exit ends thereof; said opposing sidewalls being movable in a generally transverse direction with respect to said frame between open and closed positions; said opposing sidewalls remaining generally parallel to one another as they move between their said open and closed positions;
   a first motive means for selectively moving said entrance gate and said exit gate between open and closed positions for selectively immobilizing the fore and aft movement of the livestock; and
   a second motive means for selectively moving said opposing sidewalls between open and closed positions for selectively immobilizing the lateral movement of the livestock.

2. The device of claim 1 wherein said first motive means comprises a first hydraulic power assembly operatively coupled to said entrance and exit gates for moving said entrance and exit gates between said open and closed positions.

3. The device of claim 2 wherein said second motive means comprises a second hydraulic power assembly operatively coupled to said opposing sidewalls for moving said opposing sidewalls between said open and closed positions.

4. The device of claim 1 further comprising an elongated control arm, having first and second ends; said first end of said control arm being operatively and pivotally secured to said frame, adjacent the upper end thereof.

5. The device of claim 1 wherein said opposing sidewalls are further comprised of at least one lower panel, having inward and outward facing surfaces, operatively pivotally secured to said opposing sidewalls adjacent the lower end thereof so that said at least one lower panel can be selectively moved between open and closed positions.

6. The device of claim 5 wherein said at least one lower panel is adapted to be selectively secured in said closed position.

7. The device of claim 5 wherein said inward facing surface of said at least one lower panel is substantially planar to prevent livestock within the device from using said at least one lower panel as a foothold.

8. The device of claim 1 wherein said opposing sidewalls are further comprised of at least one upper panel pivotally secured adjacent the upper end of said opposing sidewalls so that said at least one upper panel can be selectively moved between open and closed positions.

9. The device of claim 8 wherein said at least one upper panel is adapted to be selectively secured in said closed position.

10. The device of claim 8 wherein said at least one upper panel is adapted to be selectively removed from said opposing sidewalls.

11. The device of claim 8 wherein at least one opening is formed in said at least one upper panel to allow an operator access to the livestock therethrough.

12. The device of claim 11 further comprising at least one generally elongated flap operatively secured to said at least one upper panel to selectively cover said at least one opening in said at least one upper panel.

13. The device of claim 1 further comprising an anti-rear member, operatively secured to the frame closely adjacent the upper end thereof; said anti-rear member being adapted to prevent livestock within the device from exiting the device through the upper end thereof.

14. The device of claim 1 wherein said base is further comprised of at least one generally planar floor panel; said at least one floor panel being adapted to operatively removably engage the frame adjacent the lower end thereof so that said at least one floor panel may be removed or interchanged.

15. The device of claim 1 wherein said base is further comprised of a plurality of elongated bars operatively secured to the lower end of said frame in a generally horizontally spaced relation to one another; said bars extending transversely with respect to said frame.

16. The device of claim 1 further comprising at least one elongated access door operatively pivotally secured to one of said opposing sidewalls; said at least one elongated access door being adapted to pivot about a generally vertical axis between open and closed positions.

17. The device of claim 1 wherein each of said opposing sidewalls is further comprised of at least one elongated access door operatively pivotally secured thereto; said at least one elongated access door being adapted to pivot about a generally vertical axis between open and closed positions.

18. The device of claim 1 further comprising at least one generally elongated neck extender having first and second ends; said first end of said at least one neck extender being operatively pivotally coupled to said frame adjacent said exit end thereof; said at least one neck extender being adapted to selectively, arcably pivot outwardly from said entrance end from its first end to engage the head and neck of the animal to secure the same.

19. The device of claim 18 further comprising a hydraulic assembly; said hydraulic assembly being operatively secured to said at least one neck extender for selectively pivoting said at least one neck extender between extended and retracted positions.

20. The device of claim 1 further comprising at least one generally elongated hip immobilizing member operatively removably secured to one of said opposing sidewalls; said at least one hip immobilizing member being adapted to be moved between extended and retracted positions to selectively restrict lateral movement of the livestock proximal its hip area.

21. A device for working livestock, comprising:
an elongated frame having upper and lower ends and entrance and exit ends;
an elongated generally horizontal base; said base being operatively secured to said frame adjacent the lower end thereof;
an entrance gate operatively secured to said frame at said entrance end thereof; said entrance gate being adapted to move between open and closed positions generally transversely with respect to said frame;
an exit gate operatively secured to said frame at said exit end thereof; said exit gate being adapted to move between open and closed positions generally transversely with respect to said frame;
opposing sidewalls operatively movably secured to said frame between the entrance and exit ends thereof; said opposing sidewalls being movable in a generally transverse direction with respect to said frame between open and closed positions; said opposing sidewalls remaining generally parallel to one another as they move between their said open and closed positions;
a first motive means for selectively moving said entrance gate and said exit gate between open and closed positions for selectively immobilizing the fore and aft movement of the livestock;
a second motive means for selectively moving said opposing sidewalls between open and closed positions for selectively immobilizing the lateral movement of the livestock;
an elongated control arm, having first and second ends; said first end of said control arm being operatively and pivotally secured to said frame, adjacent the upper end thereof; and
at least one controller operatively coupled to said control arm, closely adjacent the second end thereof; said controller being adapted to selectively actuate said first and second motive means.

22. The device of claim 4 wherein said controller arm is further comprised of a plurality of generally elongated segments operatively and pivotally coupled to one another so that said second end of said controller arm is selectively positionable around the frame.

23. The device of claim 21 wherein said first motive means is comprised of a hydraulic power assembly, having at least one hydraulic cylinder, operatively connected to said at least one controller.

24. The device of claim 23 further comprising a first roller chain assembly operatively connecting said hydraulic power assembly to said entrance gate for selectively moving said entrance gate between open and closed positions.

25. The device of claim 7 further comprising a second roller chain assembly operatively connecting said hydraulic power assembly to said exit gate for selectively moving said exit gate between open and closed positions.

26. The device of claim 21 wherein said second motive means is comprised of a hydraulic power assembly, having at least one hydraulic cylinder, operatively connected to said at least one controller.

27. The device of claim 26 further comprising a roller chain assembly operatively connecting said hydraulic power assembly to said opposing sidewalls for selectively moving said opposing sidewalls between open and closed positions.

28. A device for working livestock, comprising:
an elongated frame having upper and lower ends and entrance and exit ends;
an elongated generally horizontal base; said base being operatively secured to said frame adjacent the lower end thereof;
an entrance gate operatively secured to said frame at said entrance end thereof; said entrance gate being adapted to move between open and closed positions generally transversely with respect to said frame; an exit gate operatively secured to said frame at said exit end thereof; said
exit gate being adapted to move between open and closed positions generally
transversely with respect to said frame;
opposing sidewalls operatively movably secured to said frame between the entrance and exit ends thereof; said opposing sidewalls being movable in a generally transverse direction with respect to said frame between open and closed positions; said opposing sidewalls remaining generally parallel to one another as they move between their said open and closed positions;
a first motive means for selectively moving said entrance gate and said exit gate between open and closed positions for selectively immobilizing the fore and aft movement of the livestock;
a second motive means for selectively moving said opposing sidewalls between open and closed positions for selectively immobilizing the lateral movement of the livestock; and
an elongated abdomen support, having upper and lower ends, operatively secured to the base in longitudinal relation thereto.

29. The device of claim 28 wherein said abdomen support is comprised of a generally angular, elongated beam, having first and second ends, and an elongated support operatively secured to said beam adjacent the first end thereof.

30. The device of claim 29 wherein said support is operatively pivotally secured to said beam so that the height of said abdomen support with respect to said base can be selectively adjusted.

31. The device of claim 30 wherein said base is comprised of a plurality of generally elongated, horizontally spaced, transversely disposed floor rods.

32. The device of claim 31 wherein said abdomen support is further comprised of at least one generally U-shaped bracket disposed adjacent the lower end of said abdomen support; said at least one U-shaped bracket being adapted to operatively removably receive at least one of said floor rods.

33. A device for working livestock, comprising:
an elongated frame having upper and lower ends and entrance and exit ends;
an elongated generally horizontal base having a plurality of elongated bars operatively secured to the lower end of said frame in a generally horizontally spaced relation to one another; said bars extending transversely with respect to said frame; said plurality of elongated bars being arranged in a generally vertically spaced relation to one another to form alternating upper and lower traction steps for the livestock within the device; said base being operatively secured to said frame adjacent the lower end thereof;
an entrance gate operatively secured to said frame at said entrance end thereof; said entrance gate being adapted to move between open and closed positions generally transversely with respect to said frame;

an exit gate operatively secured to said frame at said exit end thereof; said exit gate being adapted to move between open and closed positions generally transversely with respect to said frame;

opposing sidewalls operatively movably secured to said frame between the entrance and exit ends thereof; said opposing sidewalls being movable in a generally transverse direction with respect to said frame between open and closed positions; said opposing sidewalls remaining generally parallel to one another as they move between their said open and closed positions;

a first motive means for selectively moving said entrance gate and said exit gate between open and closed positions for selectively immobilizing the fore and aft movement of the livestock; and a second motive means for selectively moving said opposing sidewalls between open and closed positions for selectively immobilizing the lateral movement of the livestock.

34. The device of claim 20 further comprising a hydraulic assembly for selectively moving said at least one hip immobilizing member between extended and retracted positions.

* * * * *